March 24, 1953  R. C. GOERTZ  2,632,574
REMOTE-CONTROL MANIPULATOR
Filed Dec. 16, 1949  18 Sheets-Sheet 1
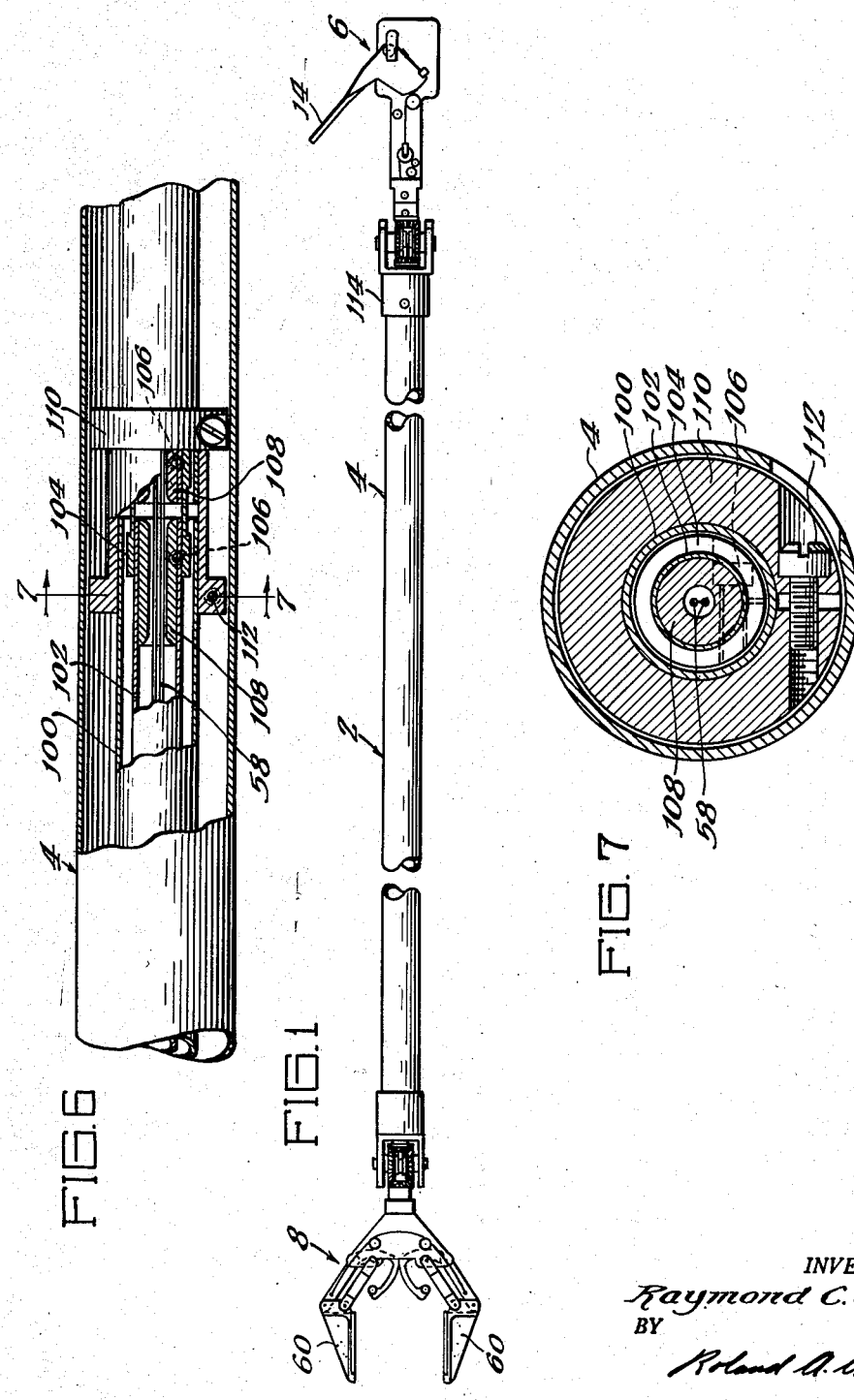
INVENTOR.
Raymond C. Goertz
BY
Roland A. Anderson
Attorney

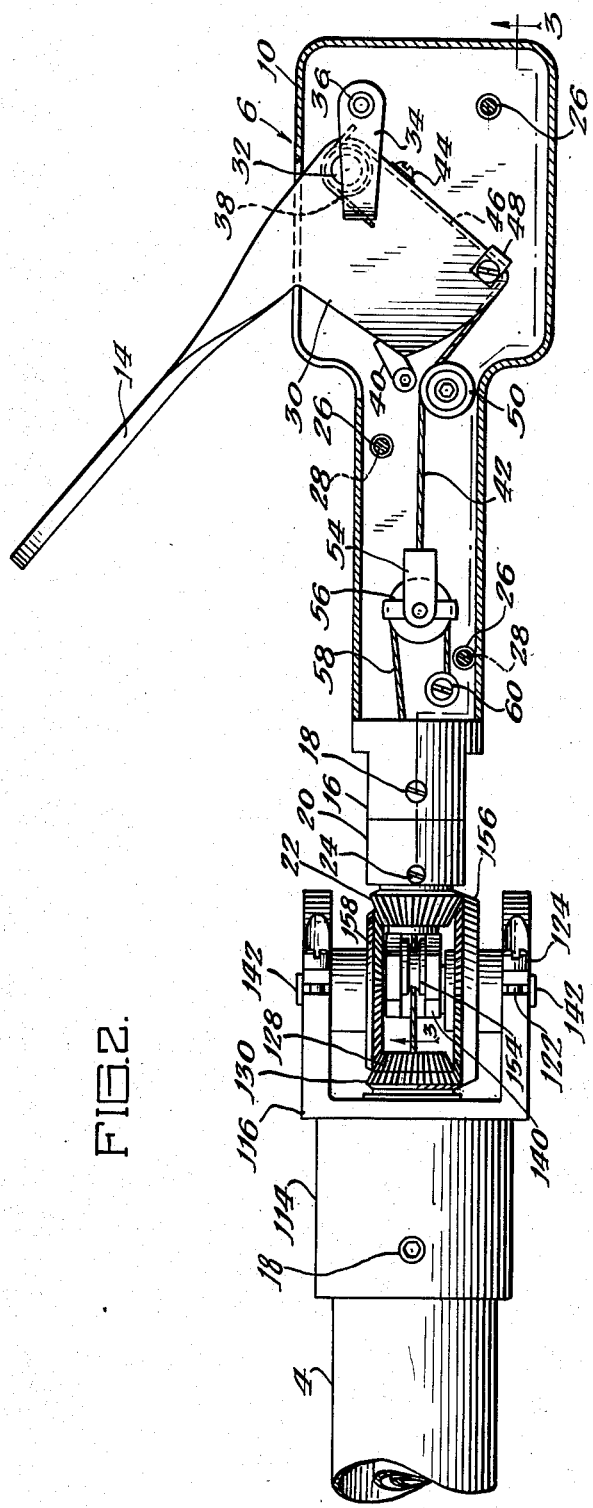

March 24, 1953

R. C. GOERTZ 2,632,574

REMOTE-CONTROL MANIPULATOR

Filed Dec. 16, 1949

INVENTOR.
Raymond C. Goertz
BY
Roland A. Anderson
Attorney

March 24, 1953
R. C. GOERTZ
2,632,574
REMOTE-CONTROL MANIPULATOR
Filed Dec. 16, 1949
18 Sheets-Sheet 4
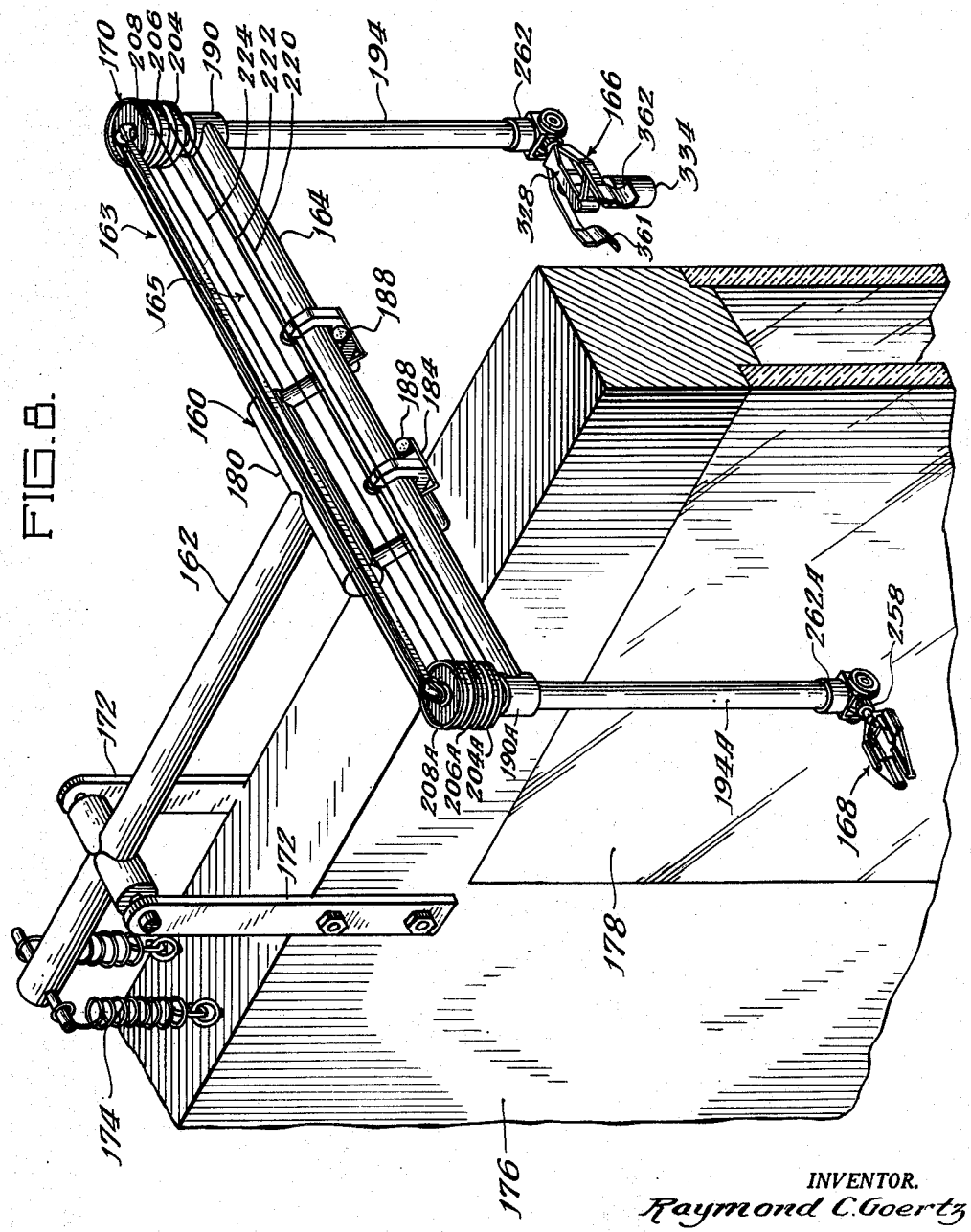
INVENTOR.
Raymond C. Goertz
BY
Roland Q. Anderson
Attorney.

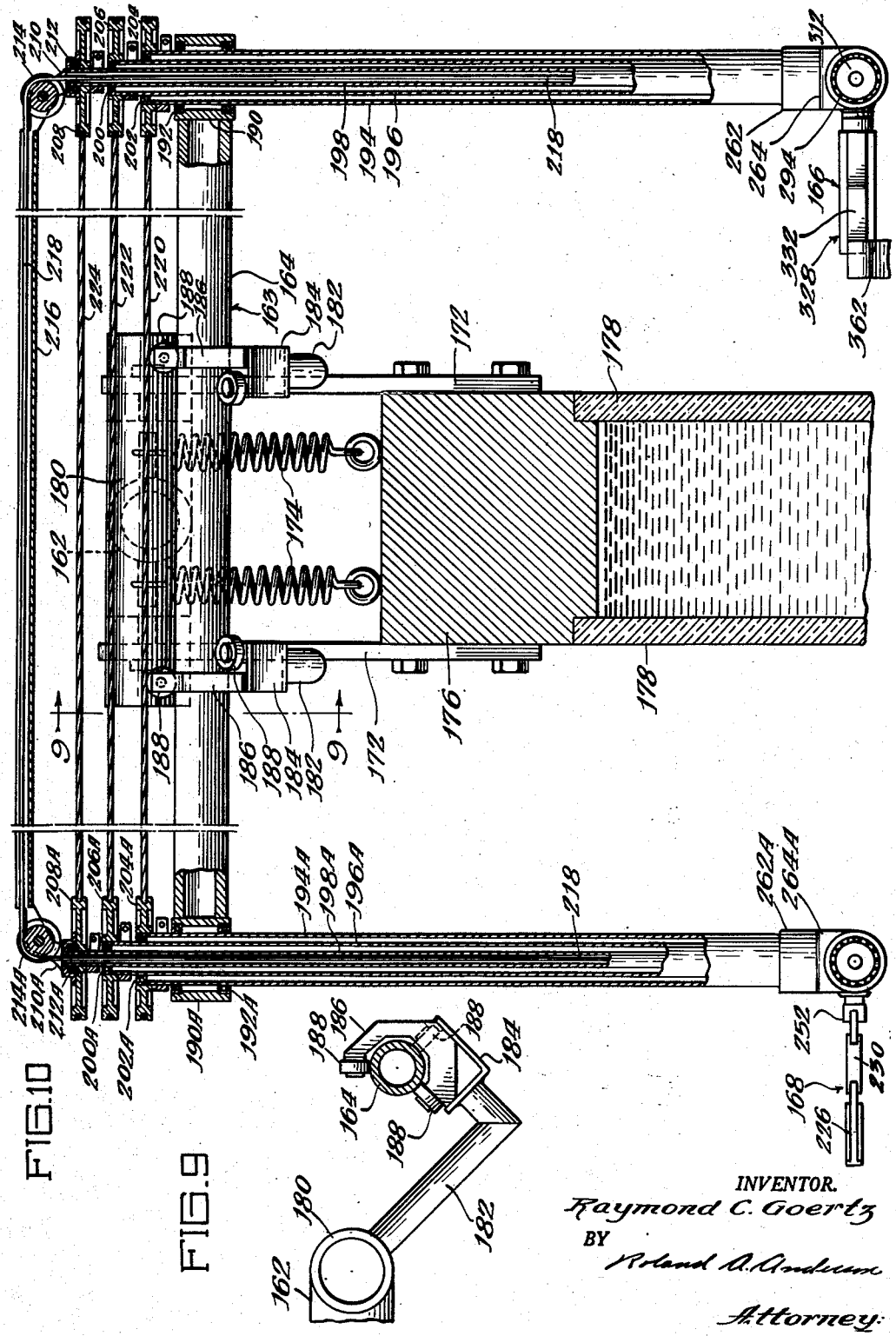

March 24, 1953  R. C. GOERTZ  2,632,574
REMOTE-CONTROL MANIPULATOR
Filed Dec. 16, 1949  18 Sheets-Sheet 6

INVENTOR.
Raymond C. Goertz
BY
Roland A. Anderson
Attorney.

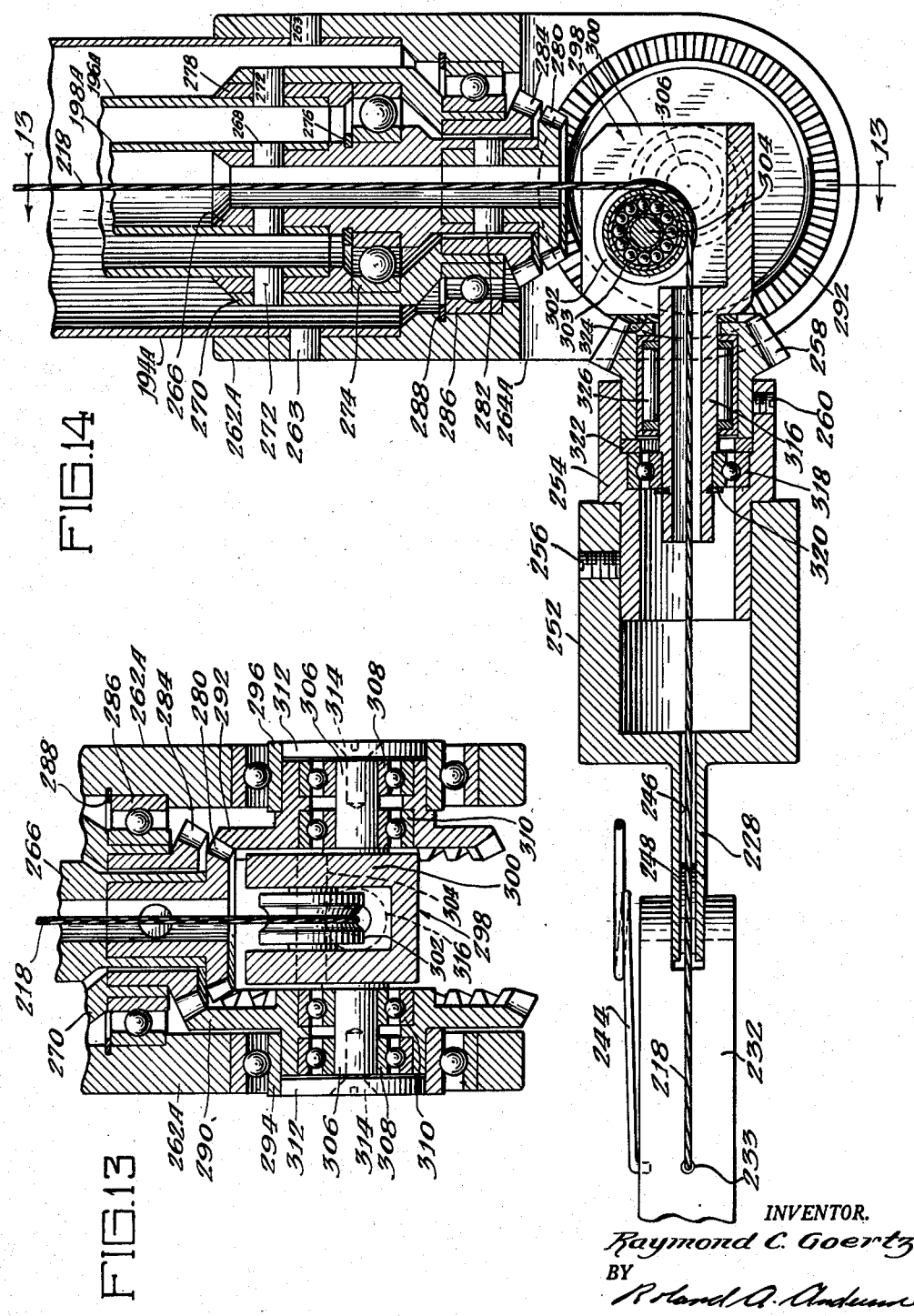

March 24, 1953

R. C. GOERTZ 2,632,574

REMOTE-CONTROL MANIPULATOR

Filed Dec. 16, 1949

INVENTOR.
Raymond C. Goertz
BY
Roland A. Anderson
Attorney

March 24, 1953 — R. C. GOERTZ — 2,632,574
REMOTE-CONTROL MANIPULATOR
Filed Dec. 16, 1949 — 18 Sheets-Sheet 10

INVENTOR.
Raymond C. Goertz
BY
Roland A. Anderson
Attorney

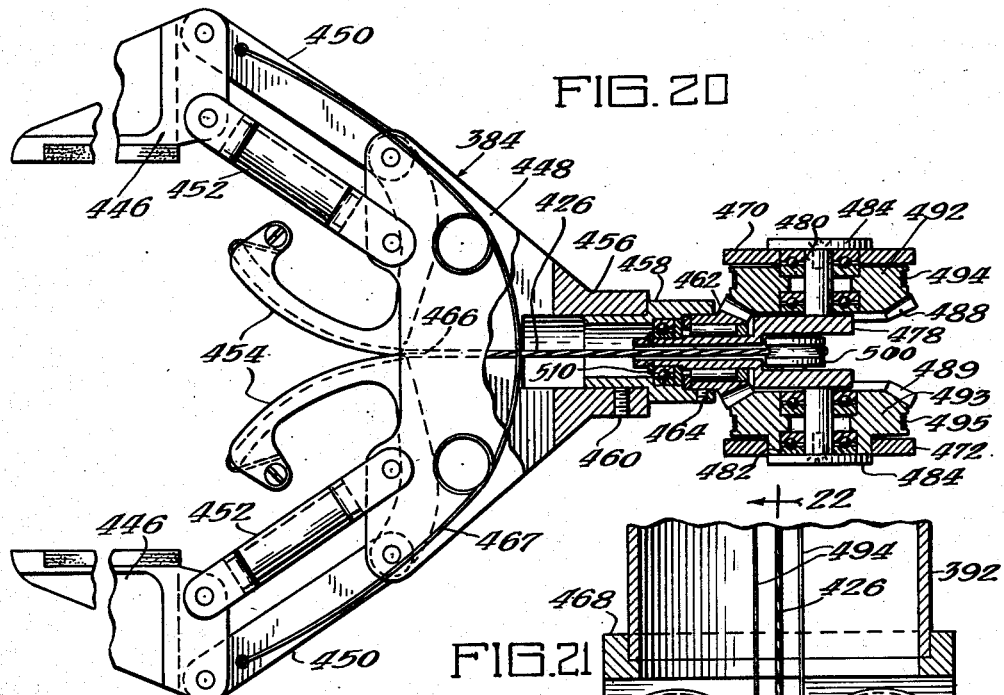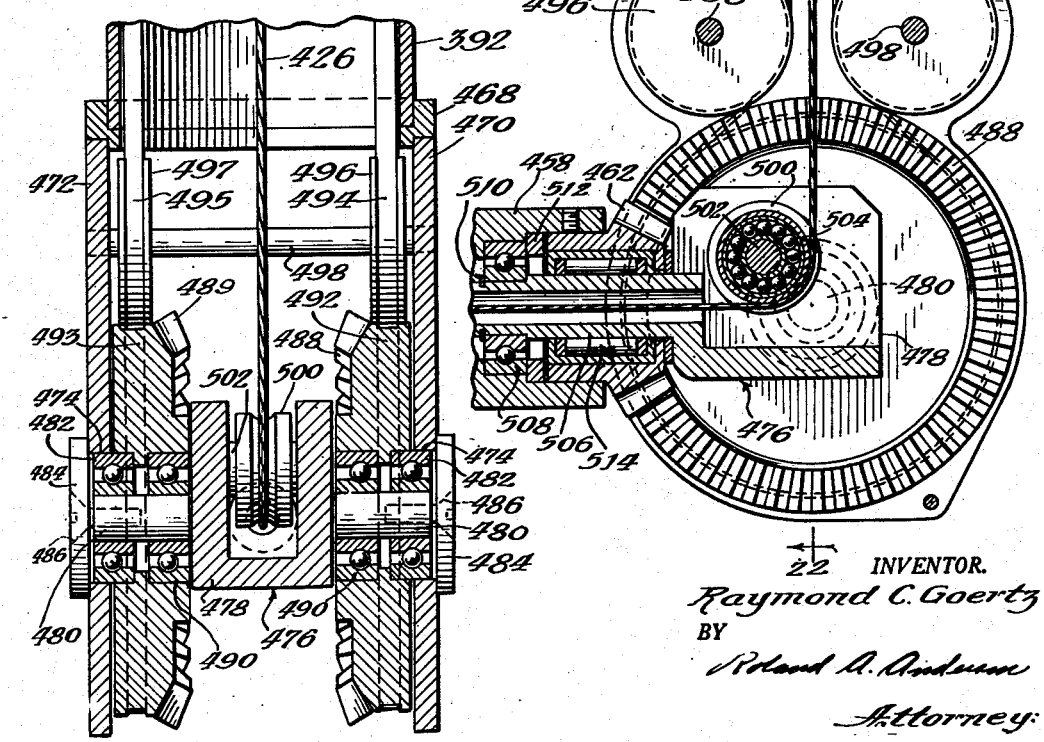

March 24, 1953 R. C. GOERTZ 2,632,574
REMOTE-CONTROL MANIPULATOR
Filed Dec. 16, 1949 18 Sheets-Sheet 12
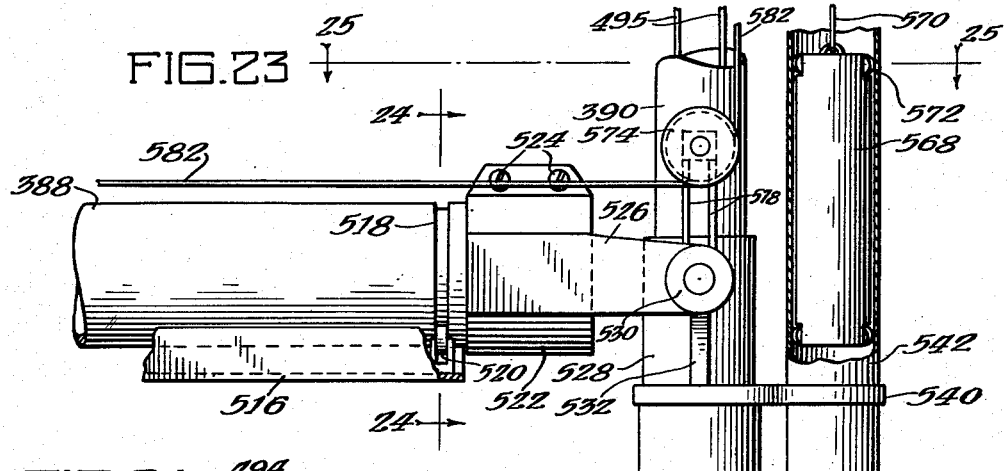
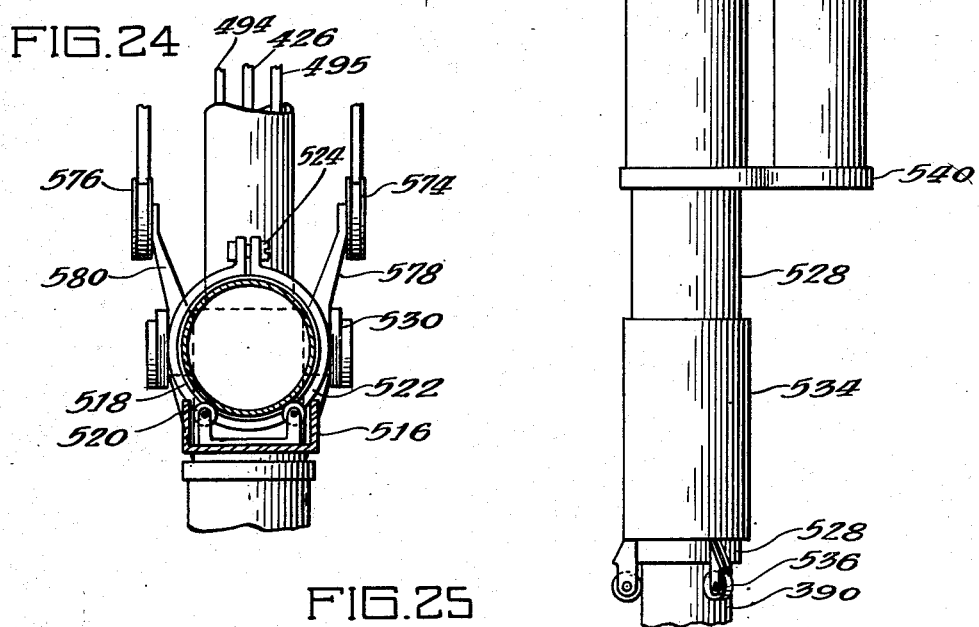
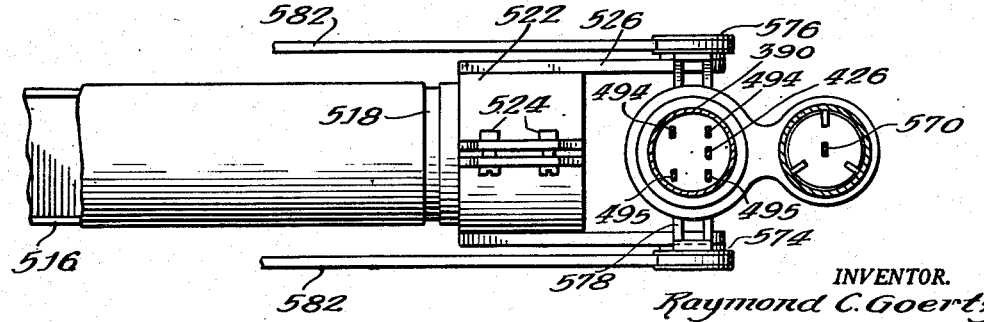
INVENTOR.
Raymond C. Goertz
BY
Roland A. Anderson
Attorney March 24, 1953   R. C. GOERTZ   2,632,574
REMOTE-CONTROL MANIPULATOR
Filed Dec. 16, 1949   18 Sheets-Sheet 13

INVENTOR.
Raymond C. Goertz
BY
Roland A. Anderson
Attorney.

INVENTOR.
Raymond C. Goertz
BY
Roland A. Anderson
Attorney

March 24, 1953     R. C. GOERTZ     2,632,574
REMOTE-CONTROL MANIPULATOR

Filed Dec. 16, 1949     18 Sheets-Sheet 15

INVENTOR.
Raymond C. Goertz
BY
Roland A. Anderson
Attorney

March 24, 1953     R. C. GOERTZ     2,632,574
REMOTE-CONTROL MANIPULATOR
Filed Dec. 16, 1949     18 Sheets-Sheet 17
FIG. 33
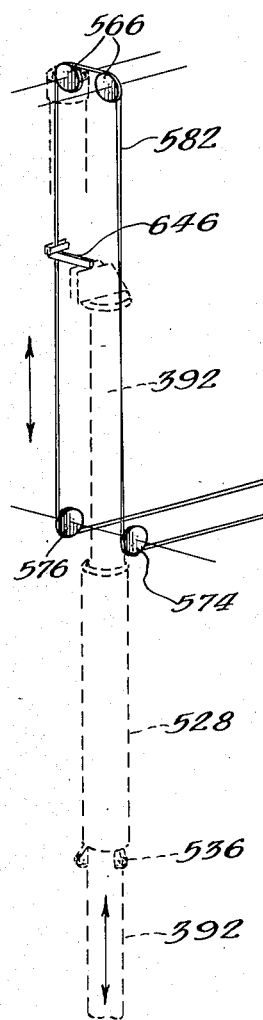
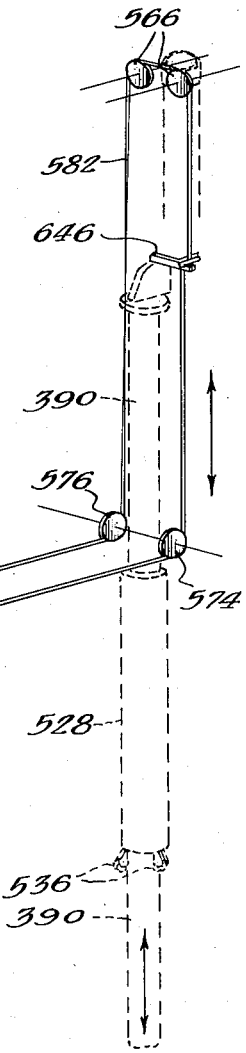
INVENTOR.
Raymond C. Goertz
BY
Roland A. Anderson
Attorney March 24, 1953    R. C. GOERTZ    2,632,574
REMOTE-CONTROL MANIPULATOR
Filed Dec. 16, 1949    18 Sheets-Sheet 18
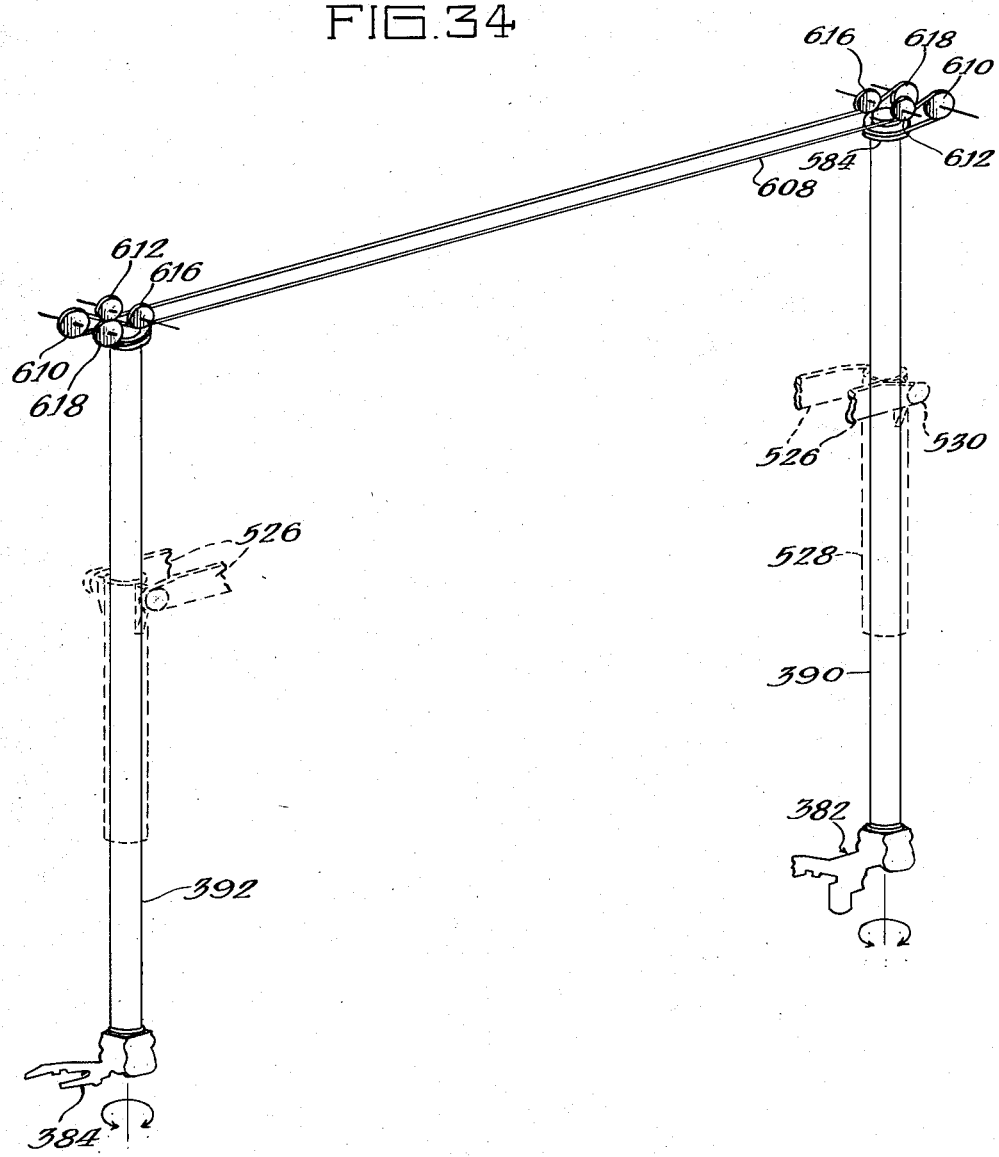
INVENTOR.
Raymond C. Goertz
BY
Roland A. Anderson
Attorney Patented Mar. 24, 1953

2,632,574

UNITED STATES PATENT OFFICE 2,632,574

REMOTE-CONTROL MANIPULATOR

Raymond C. Goertz, Elmhurst, Ill., assignor to the United States of America as represented by the United States Atomic Energy Commission Application December 16, 1949, Serial No. 133,440

14 Claims. (Cl. 214—1)

This invention relates to a device for mechanical manipulation and more particularly it pertains to a remote control manipulator.

In order to experiment safely with radioactive material it is necessary to minimize as much as possible the effect of harmful radioactivity, such as gamma rays. This need has fostered the development of many remote controlled devices whereby the experimenter may perform his operations indirectly from behind a protective wall, observing the result of his motions through either a set of mirrors or a shielded window in the wall. Up to this time such manipulators have not only been clumsy and relatively limited in the movements required of them, but they have demanded extensive practice on the part of the operator before he can rely upon them in his experiments. The present invention has been developed with these objectionable features in mind. The device embodying this invention is dexterous to handle and capable of manipulation within wide limits. In addition, it has been designed to duplicate as much as possible the motions of the operator; namely, the motions of his hand, wrist and arm.

The present invention consists of a horizontal tube which may be mounted either through or over a protective wall. Of the several embodiments to be described the simplest has the tongs or jaws attached to one end of the tube and the manipulating handle attached to the other end. This embodiment called the straight arm manipulator, is mounted through the protective shield. It offers three-dimensional rotation. Another embodiment has a vertical shaft appended to each end of the horizontal tube. To the lower end of one shaft is disposed the manipulator or handle and on the other shaft is attached the tongs. The third embodiment is similar to the second in that a vertical shaft is appended to each end of an elongated tube. A handle is mounted on the lower end of one shaft while a tongs is similarly mounted on the other shaft. In each embodiment between the handle and tongs are the connecting means for transferring motions of the handle to the tongs. These means are disposed compactly in the vertical shafts and the elongated tube. By virtue of the latter embodiments the operator has freedom of motion in three dimensions, and three-dimensional rotation.

In the drawings:

Figure 1 is a plan view of one embodiment of a manipulator showing a portion thereof broken away;

Figure 2 is an enlarged plan view of the handle of the embodiment shown in Figure 1;

Figure 3 is a vertical sectional view of the handle taken on the line 3—3 of Figure 2;

Figure 4 is a plan view partly in section of the tongs and gear assembly of the embodiment shown in Figure 1;

Figure 5 is an elevational view of the tongs of the embodiment shown in Figure 1;

Figure 6 is an enlarged fragmentary view of a portion of the elongated tube between the handle and tongs, showing the manner in which the inner concentric tubes are joined;

Fig. 7 is a cross-sectional view of the supporting unit taken on the line 7—7 of Figure 6;

Figure 8 is a perspective view of the second embodiment of a manipulator, showing the manner in which it is mounted over a protective wall;

Figure 9 is an end view partly in section of a portion of the support of the manipulator taken on the line 9—9 of Figure 10;

Figure 10 is an elevational view partly in section of the embodiment shown in Figure 8;

Figure 13 is a sectional end view of the gear assembly to which the tongs and handle are attached;

Figure 14 is a side elevational view in section of the gear assembly shown in Fig. 13, indicating the manner in which the tongs are attached thereto;

Figure 20 is an enlarged plan view partly in section of the tongs of the embodiment shown in Figure 17, indicating the manner in which the tongs are attached to the gear assembly as shown in Figure 22;

Figure 21 is a side elevational view in section of the gear assembly shown in Figure 22;

Figure 22 is a sectional end view of the gear assembly to which the tongs and handle are attached, taken on line 22—22 of Figure 21;

Figure 23 is a fragmentary elevational view partly in section of one of the parallel arms showing the connection between the arm and the elongated tube above the handle;

Figure 24 is a fragmentary end view partly in section of the parallel arm and elongated tube taken on the line 24—24 of Figure 23;

Figure 25 is a fragmentary plan view partly in section of the parallel arm and the elongated tube showing the connection between them;

Figure 33 is a diagrammatic drawing of the continuous tape by which the parallel arms are moved simultaneously in the direction shown by the arrows; and Figure 34 is a diagrammatic drawing of the continuous tape by which the parallel arms are rotated simultaneously in the directions shown by the arrows.

Figure 12:
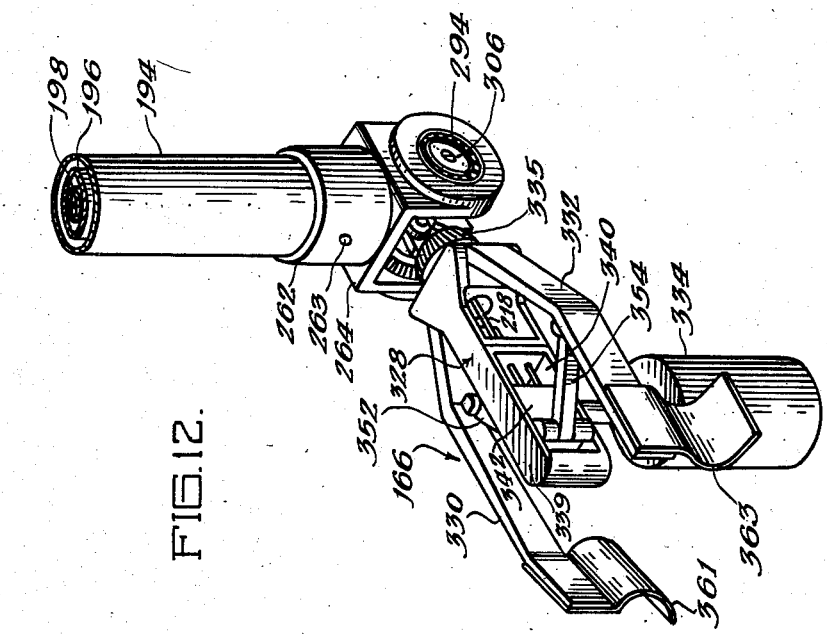
Figure 12 is an enlarged perspective view of the handle of the embodiment shown in Figure 8.

The simplest embodiment to be described herein is that generally indicated at 2 in Figure 1. It comprises an intermediate supporting unit which includes an elongated tube 4 with a handle 6 disposed at one end and a tongs 8 at the other end. The intermediate supporting unit also includes within tube 4 the motion-conveying mechanism which will be described below. In Figures 2 and 3 the handle 6 is displayed in detail. It consists of a frame 10, a cover 12, and a lever means 14. More particularly, the frame 10 consists of a flat member generally outlined in Figure 2, to one end of which is disposed a casing 16. By means of a set screw 18 the casing 16 is annexed to a sleeve 20 which is rigidly secured to a pinion 22 by a set screw 24. A plurality of posts 26 are imbedded in the flat member of the frame 10 and extend perpendicularly therefrom to a height approximately equal to the diameter of the casing 16. The cover 12 is adapted to fit the periphery of the frame 10 and to form a compartment therewith. The frame 10 is held in place by screws 28 disposed in the top of the posts 26. The cover is apertured in one wall to accommodate the lever means 14 extending from a rectangular body 30 which is pivoted on a pin 32 where it is kept in place by a keeper 34 extending horizontally from a post 36. Both the pin 32 and the post 36 are mounted in the flat portion of the frame 10. A wire spring 38, mounted around the pin 32, rotates the lever means 14 in a clockwise direction when the operator releases it until the rectangular body 30 encounters a stopper 40, which extends from the frame 10. A cable 42 is secured to the rectangular body 30 by means of a screw 44 and is seated in a groove 46 along the periphery of said body where it is held by a retainer 48. From the groove 46 the cable 42 follows a course past a pulley 50 which is disposed on a post 52 extending from the frame 10. The other end of the cable 42 is secured to a pulley block 54 and a pulley 56. The pulley 56 is suspended in place by a cable 58, one end of which is anchored to a post 60 which extends from the frame 10. From the pulley 56 the cable 58 extends past the casing 16 and the sleeve 20 and the pinion 22 through the elongated tube 4 to the tongs 8.

The tongs 8, disposed at the other end of the tube 4, is more clearly shown in the Figures 4 and 5. The tongs includes a pair of jaws 60 which are coupled to a support member 62 by means of parallel links 64 and 66. On the one hand the link 64 has a tubular cross-section and is bifurcated at each end. The end of the jaws 60 is also bifurcated and said bifurcations are disposed between the bifurcations of the link 64, being pivoted thereto by a pin 68. Likewise the support member 62 is bifurcated transversely and said bifurcated members are disposed between the bifurcated ends of the link 64 at which point they are pivoted by a pin 70. On the other hand the link 66 is a flat member which is attached to the jaw 60 and to the support member 62 between the bifurcations of each by a pin 72 and 74, respectively. The link 66 extends beyond the pin 74 between the bifurcations of the support member 62 and then turns outwardly therefrom at the center of said support member between the links 64, forming rocker arms 76. At the center of the support member 62 the rocker arms contact each other tangentially at curved edges. A peripheral groove 78 also follows the same curved edges beginning at the point of contact of the rocker arms 76 and terminates at the outer extremity where there is a screw 80. The cable 58, which was mentioned above as being anchored in the handle 6 and which extends through the tube 4 to the tongs 8, is spliced at a point within the tube 4 so that two branches constitute the second end which are seated in the groove 78 and anchored at the screws 80. It is to be pointed out that the distances between the pivot pins 72 and 68, and 74 and 70 on the one hand, and between the pivot pins 68 and 70, and 72 and 74 on the other hand are respectively equal. In other words they define a parallelogram. On the contact surfaces of the jaws 60 a padding 82 is disposed which prevents the article to be lifted from slipping. In each link 66 a small aperture 84 is provided for the ends of a wire spring 86 which is disposed against the tongs in the shape of a horseshoe. The spring 86 opens the jaws when tension is released on the cable 58. On the support member 62 a casing 88 is disposed centrally on the longitudinal axis. The casing is communicative with the space between the bifurcations of the member 62. Seated within the casing 88 is a sleeve 90, secured by a set screw 92.

In turn, a pinion 94 is seated within the sleeve 90 where it is held by a set screw 96.

As shown in Figure 6 the tube 4 contains two tubes 100 and 102 the latter of which is disposed concentrically within the former. Each tube functions independently of the other and consists of two sections which are joined at a central location within the tube 4. A coupling 104 joins the sections of the tube 102. Since the coupling 104 is split longitudinally, a screw 106 is mounted at each end to hold the tube 102 tightly. Within the end of each section of the tube 102 is mounted an inner sleeve 108 which serves as a central guide for the cable 58. In a similar manner sections of the tube 100 are joined by a coupling 110 which is also split longitudinally and secured in place by a set screw 112 located in each end of the coupling. The tubes 100 and 102 extend from one end of tube 4 to the other.

Each end of the tube 4 is seated in a sleeve 114 which is integral with a bifurcated member 116 (Figures 2 and 4). A small set screw 118 holds the tube 4 within the sleeve 114. As shown in Figure 5 each branch of the bifurcated member 116 is apertured at 120 so that each aperture is coaxial with the other on an axis normal to that of the tube 4. In addition each bifurcated branch is split at 122 for which a tightening screw 124 is provided as shown in Figures 2 and 5.

Between the branches of the bifurcated member 116 is disposed a gear assembly generally indicated at 126 as shown in cross-section in Figure 4. While this assembly is identical with that shown in the plan view of Figure 2, the description will follow Figure 4 as much as possible. The ends of the tubes 100 and 102 are attached to hubs of bevel gears 130 and 128, respectively, by means of a knurl and press joint. The tube 100 is maintained centrally of the sleeve 114 by means of a ball bearing 132 which is fixed in place by an annulus 134 and is separated from the bevel gear 130 by a collar spacer 136. In the center of the gear assembly is a gear supporting member generally indicated at 138 which comprises several integrated parts. The central part is a yoke 140 through which passes the cable 58. Extending on each side of the yoke 140 is a trunnion 142, the extremities of which are mounted in bushings 144 which are contained within the apertures 120 in each bifurcated member 116. Another part of the gear supporting member 138 is a shaft 146 extending in a direction normal to the trunnions 142. To the end of the shaft 146 the tongs 8 is mounted rotatably by means of a ball bearing 148 which is seated within the sleeve 90. Between the ball bearing 148 and the pinion 94 is a collar 150. In the center of the ball bearing 148 the shaft 146 is secured by a split ring 152 on the outer surface of the shaft adjacent the bearing. This shaft is bored longitudinally for passage of the spliced cable 58. The remaining part of the gear supporting member 138 is a small pulley 154, as shown in the plan view of Figure 2. It is situated between the branches of the yoke 140 and engages the cable 58 when the handle is disposed at an angle with said elongated tube 4.

A pair of bevel gear wheels 156 and 158 are mounted on trunnions 142 which are provided with cylindrical bushings 160 (Figure 4). The wheel 156, having a greater diameter than that of the wheel 158, connects the pinion 94 to the bevel gear 130, and the wheel 158 connects pinion 94 to the bevel gear 128. As shown in Figure 2 a similar gear assembly is mounted on the other end of the tube 4 by which the handle 6 is attached. Here the sleeve 20 is mounted by means of the ball bearing 148 in identical manner as sleeve 90 (Figure 3). In the center of the ball bearing 148, the shaft 146 is disposed on the axis of the pinion 22, and is secured by the split ring 152. In addition, the pinion 22 is connected to the bevel gears 128 and 130 by the bevel gear wheels 158 and 156, respectively.

This device is easily operated, for it has three functional movements. The first movement is that of operating the jaws of the tongs. This is accomplished by rotating the lever means 14 in a counterclockwise direction about its pivot point 32. This rotational movement is transferred to a lineal movement by a cable 42 shown in Figures 2 and 3. In turn, this operates the pulley 56 which transmits the motion through the cable 58 to the tongs 8. By pulling the cable 58 the rocker arms 76 roll along each other until the outer extremities thereof are contiguous to each other. At the same time the jaws 60 are moved together by virtue of the parallel linkage motion inherent in the parallelogram defined by the pivot points 68, 70, 72 and 74. In order to open the tongs again the tension on the lever means 14 is relaxed and the wire spring 38 rotates it clockwise to a resting point. Meanwhile the wire spring 86 separates the jaws 60.

The second motion is the rotation of the tongs 8 in a clockwise or counterclockwise direction about the axis of the tube 4. This is accomplished simply by rotating the handle 6 in the desired direction. Referring to Figures 2 and 3, when the handle 6 is rotated in either direction about the shaft 146, the gear wheels 156 and 158 rotate in opposite directions with respect to each other. But the gears 128 and 130 revolve in the same direction to each other whereby the tubes 100 and 102 act similarly. At the other end of the tube (Figure 4) the motions are transmitted in reverse order through a similar gear assembly 126 and cause the tongs 8 to turn in the same direction as the handle.

The third motion is the rotation of the tongs 8 in a clockwise or counterclockwise direction about the axis of the trunnions 142. As shown in Figure 2, when the handle is turned about the trunnions 142, the gear wheels 128 and 130 revolve in the same direction since the pinion 22 remains fixed. However, the gear wheels 128 and 130 revolve in opposite directions to each other, causing tubes 100 and 102 to act accordingly. Referring again to Figure 4, the motions are transmitted in reverse order through a similar gear assembly 126, revolving the tongs 8 in the same direction as the handle. Due to the fact that the gear wheel 156 has a greater diameter than gear wheel 158, a slightly higher mechanical advantage exists in the former causing the gear 130 to revolve faster than the gear 128, whether they revolve in similar or opposite directions. This fact, however, is resolved out before it reaches the pinion 94 in the tongs 8 by the reverse action of the gear assembly at the same location. In other words, the advantage put into the tubes 100 and 102 by the gears at the handle end is taken out by the gears at the tongs end.

Besides using this embodiment through a shield wall, it can be constructed of light weight elements and handled by one person for materials having low amounts of irradiation or for biological purposes.

The second embodiment of this invention is that depicted in Figures 8 to 16. It is adapted to straddle a protective wall. As shown in Figure 8, the manipulator generally indicated at 160 comprises a support lever 162, an intermediate supporting unit generally indicated at 163, which includes among other elements an elongated tube 164 and transverse cables generally indicated at 165, a handle 166, tongs 168, and motion-conveying means generally indicated at 170 which is part of the intermediate supporting unit.

The support lever 162 is a first-class lever being pivoted on two anchor brackets 172. Beyond the brackets 172 are two counterbalance springs 174 attached to one end of the lever 162. Both brackets 172 and the springs 174 are anchored to a protective wall 176 which has an observation window 178. In order to inhibit the passage of harmful radioactive rays window glass of ordinary thickness will not suffice. Rather a thick mass of glass is required to stop the gamma radiation. Or, the window may consist of an aqueous solution of zinc bromide contained between two plates of glass. At the other end of the support lever 162 and perpendicular to the axis thereof is affixed a transverse member 180. As shown in Figure 9, to each end of the member 180 is attached a brace 182 to which is mounted an angle member 184 which supports a cradle 186. On the periphery of the cradle 186 are three roller wheels 188, which are disposed at 120° intervals on the periphery. Between these wheels the elongated tube 164 is sustained.

Referring to Figure 10, the manipulator 160 is shown in elevation partly in section. Except for the handle 166 and the tongs 168, the device has similar parts disposed at each end of the elongated tube 164. Consequently, one side will be described with certain reference characters and the other side will be given duplicate numbers with the letter "A" appended. To each end of the elongated tube 164 is attached a sleeve 190 having an axis normal to that of the transverse member. Each sleeve is provided with a pair of ball bearings 192 in which is sustained a support arm 194 which is part of the intermediate supporting unit generally indicated at 163. Within the arm 194 two tubes 196 and 198 are disposed concentrically. Referring to the top of the tubes, the inner tube 198 extends above the top of the tube 196 which in turn extends above the top of the support arm 194. The tube 198 is separated from the tube 196 by a ball bearing 200 which is disposed within the inner periphery of the latter tube. Likewise the tube 196 is separated from the support arm 194 by a ball bearing 202. To the top of the support arm 194 and the tubes 196 and 198 are mounted pulleys 204, 206 and 208, respectively, which are attached to said tubes in the usual manner. Surmounting the top of the tube 198 is a support member 210 which is mounted on a ball bearing 212 on the periphery of said tube and which is independent of the pulley 208. To the support member 210 a small pulley 214 is mounted in the usual manner. Between the support members 210 and 210A is sustained a channel member 216 which is part of the intermediate supporting unit 163. A cable 218 extends from the handle 166 through the tube 198 around the pulley 214 across the channel member 216 and through similar members on the other side of the manipulator to the tongs 168. This cable serves to close the tongs in response to a manipulation of the handle 166 to be described later. The pulleys 204 and 204A are connected by a continuous cable 220. Similarly the pulleys 206 and 206A, and 208 and 208A are connected by continuous cables 222 and 224, respectively. These cables are the transverse cables generally indicated at 165 in Figure 8.

Figure 11:
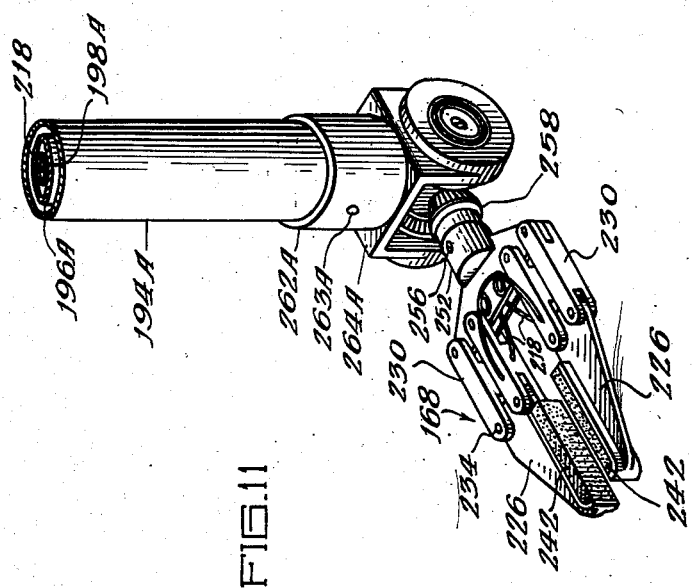
Figure 11 is an enlarged perspective view of the tongs of the embodiment shown in Figure 8.

Figures 11 and 12 show the tongs 168 and the handle 166 in perspective. While the tongs 168 vary slightly from those shown in the previous embodiment of this invention, the handle 166 is very different from that shown in the previous embodiment. Consequently each will be described in detail together with the manner by which they are attached to their respective supporting arms. Considering first the Figure 16 in which the tongs are shown in a plan view, the tongs have a pair of jaws 226 which are attached to a supporting member 228 by means of two links 230 and 232. The ends of each link are bifurcated and the jaws 226 are disposed between the bifurcation members where they are attached to the links 230 and 232 by the pins 234 and 236, respectively. Likewise the support member 228 is disposed between the bifurcations of the links 230 and 232 where it is attached by means of pins 238 and 240, respectively. By virtue of this design there exists between the pins 234, 236, 238 and 240 a parallel linkage motion similar to that in the first embodiment of this invention, whereby the operating surfaces of the jaw members 226 are sustained in parallel position. In other words, the pins define a parallelogram. The operating surfaces of the jaw members 226 are faced with a slip-resistant material 242. Adjacent the links 232 and one surface of the supporting member 228 is disposed a wire spring 244 with ends imbedded in said links. The cable 218 is spliced at the tongs end of the manipulator into two branches which are anchored singly to one of the links 232 at 233.

Figure 16:
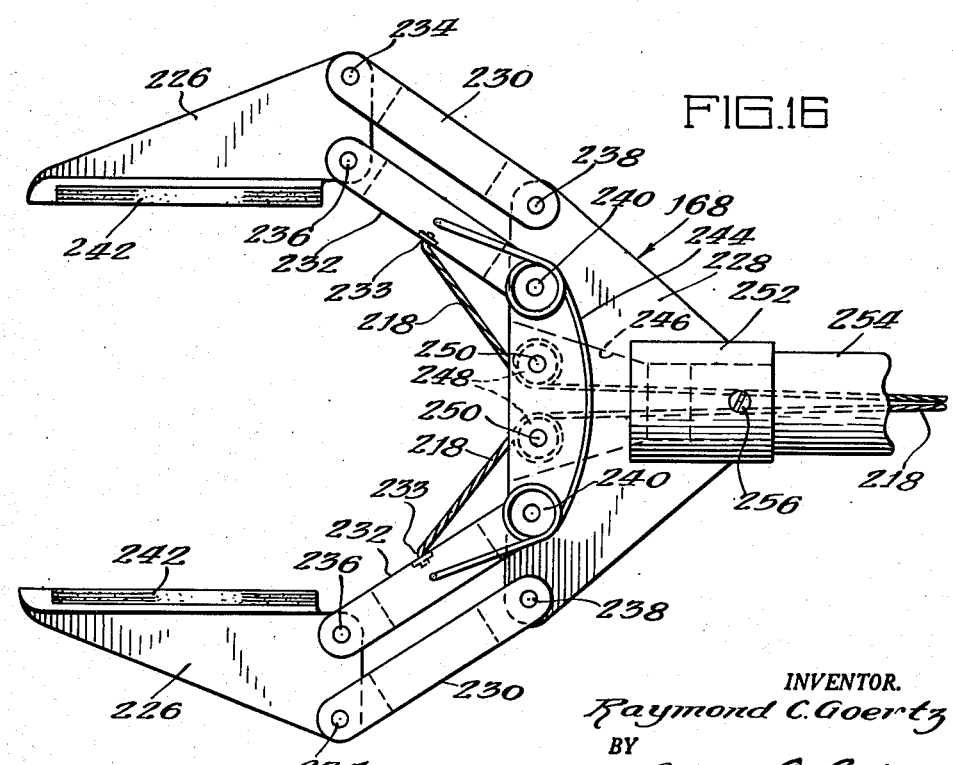
Figure 16 is an enlarged elevational view of the tongs of the embodiment shown in Figure 8.

Referring now to Figure 14 in conjunction with Figure 16, an aperture 246 is situated centrally of the support member 228 in a longitudinal direction of the tongs. Within the aperture 246 are disposed two pulleys 248 on a pin 250, the ends of which are imbedded in the upper and lower walls of the aperture 246. Integral with the support member 228 is a casing 252, the axis of which coincides with the longitudinal axis of the tongs and is communicative with the aperture 246. Seated within the casing is a sleeve 254 secured by a set screw 256. In turn, a pinion 258 is seated within the sleeve 254 where it is held by a set screw 260.

The lower ends of the support arm 194 and of the tubes 196 and 198 are terminated within a sleeve 262 which is integral with a bifurcated member 264 (Figure 12). In Figure 11 a similar member 262A is disposed at the lower ends of the arm 194A secured by pins 263A. Since the parts within each of these are identical, the particular parts described will be those shown in Figure 14 to which the tongs 168 are attached, it being understood that the handle 166 is attached to a similar arrangement (Figures 11 and 12). Referring then to Figure 14, a shaft 266 is disposed on the end of the tube 198A secured by means of pins 268. Likewise an annulus 270 is secured to the lower end of the tube 196A by means of pins 272. Below the extremities of the tubes 196A and 198A a ball bearing 274 separates the shaft 266 from the annulus 270 and is fixed in place by means of a split ring 276 imbedded in the outer periphery of the shaft 266. Collar 278 within the annulus 270 is disposed above the ball bearing 274. At the lower end of the shaft 266 is disposed a bevel gear 280, the hub of which is seated within said shaft where it is attached by pins 282. To the lower end of the annulus 270 is mounted a bevel gear 284 which is concentrically disposed about the bevel gear 280. A ball bearing 286 is disposed between the sleeve 262A and the lower end of the annulus 270 where it is secured by a split ring 288 that is seated in the inner periphery of said sleeve. In this manner the entire assembly is centered in the support arm 194A.

Referring to Figure 13, between the branches of the bifurcated member 262A are two parallel gear wheels 290 and 292 which connect the pinion 258 to the bevel gears 284 and 280, respectively. The gear wheel 290, having a larger diameter than 292, engages the bevel gear 284, while the gear wheel 292 engages the gear 280. These gear wheels are mounted within ball bearings 294 and 296 on an axis normal with that of the arm 194A. In the center of the gear assembly is disposed a gear supporting member generally indicated at 298 which consists of several integral parts. The central part is a yoke 300 within which is mounted a small pulley 302 on a ball bearing 303 disposed on a pin 304, the ends of which are imbedded in the yoke 300. Extending from each side of the yoke 300 is a trunnion 306 which is mounted centrally of the hubs of the gears 290 and 292 in ball bearings 308 and 310. A circular end plate 312 is attached to the end of the trunnion 306 by a screw 314. In Figure 14 a remaining component of the gear supporting member, namely, a shaft 316 is shown extending from the yoke 300 in a direction normal to that of the trunnions 306 and central of the pinion 258. Within the sleeve 254 is a ball bearing 318 which is disposed on the end of the shaft 316 and is secured thereto by a split ring 320. Between the ball bearings 318 and the pinion 258 is disposed an annular spacer 322. A collar 324 is situated between the pinion and the yoke 300. A roller bearing 326 on the outer periphery of the shaft 316 separates said shaft from the pinion 258. The cable 218 extends centrally of the tube 198A downwardly through the shaft 266 to the pulley 302 around which it turns to continue through the bore of the shaft 316 to the aperture 246 in the support member 228 where it engages the pulleys 248 and is anchored in the links 232 at 233.

Figure 15:
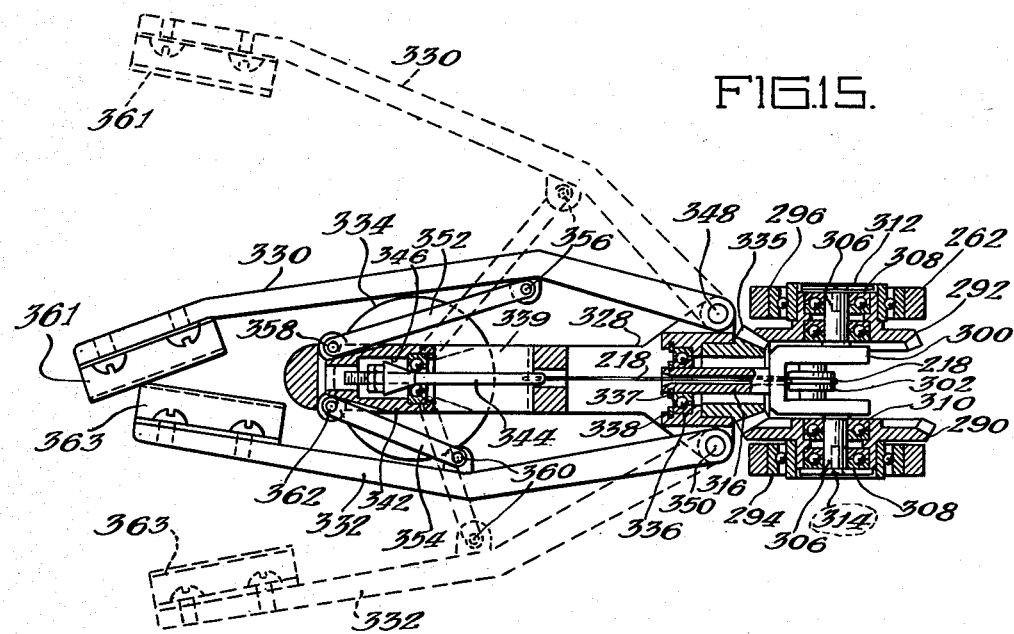
Figure 15 is an enlarged plan view partly in section of the handle of the embodiment shown in Figure 8, indicating the manner in which the handle is attached to the gear assembly shown in Figure 13.

The handle generally indicated at 166 in Figure 12 is attached to the support arm 194 in a manner similar to the attachment of the tongs 168 to the support arm 194A. In particular the handle 166 includes a central housing member generally indicated at 328, lever means including two fingers 330 and 332, and a knob 334. The central housing 328 is firmly attached to a pinion 335 disposed on an axis normal with that of the gear wheels 290 and 292. As shown in Figure 15, between the shaft 316 and the housing 328 is a ball bearing 336 which is secured in place by a split ring 337 imbedded in the outer periphery of the shaft 316 and a split ring 338 imbedded in the inner periphery of the hub portion of the housing 328. The frame work of the housing consists of two parallel members 339 and 340 which extend from the point of attachment of the housing 328 along its axis. A sliding member 342 is disposed between the members 339 and 340. The cable 218 is anchored to the sliding member 342 in an aperture 346. The fingers 330 and 332 are second-class levers being attached to the housing 328 at its point of attachment by means of pins 348 and 350, respectively. The fingers 330 and 332 flank the housing 328 and are linked to the sliding member 342 by couples 352 and 354, respectively.

The couple 352 is pivoted to the finger 330 and the sliding member 342 at points 356 and 358, respectively. Similarly the couple 354 is pivoted to the finger 332 and the sliding member 342 at the points 360 and 362, respectively. On the remaining end of each finger 330 and 332 there is mounted a curved plate 361 and 363, respectively, provided for the thumb and index finger of the operator. The knob 334 is rigidly mounted to the member 340 in a direction normal to a plane described by the fingers 330 and 332 and is adapted to fit the palm of the operator's hand.

By virtue of the fact that the manipulator was designed to imitate the movements of the operator's fingers, hands, and arms as much as possible, it is operated not only in three lineal directions but also in all rotational directions. The simple movement of closing the jaws 226 of the tongs is accomplished by grasping the knob 334 in the palm of the operator's hand and placing the thumb and index finger on the curved plates 361 and 363. It is preferable to operate two manipulators simultaneously, one for each hand. By squeezing the fingers 330 and 332 together from the open position (shown in dotted lines in Figure 15) to the closed position (shown in solid lines), the jaws 226 are closed. Thus the jaws imitate the fingers. The motion of closing the jaws is conveyed by the couplings 352 and 354 to the sliding member 342 to which is anchored the cable 218. The tension thereby applied to the cable 218 is conveyed to the tongs 168 through the spliced ends of the cable which are attached to the links 232, causing the jaws 226 to move together, as shown in Figure 16.

The three lineal movements of the manipulator are possible due to its construction. Considering Figure 8, the vertical movement may be had simply by raising or lowering the handle 166. This force is directly transferred to the lever 162 where it is compensated for by the counterbalance springs 174. In this manner an upward thrust by the operator will cause the springs 174 to contract, while a downward thrust will cause the springs to expand. Manifestly, the counterbalance springs 174 offset the weight of the manipulator, relieving the operator of the burden of constantly applying a force equal to the weight of the manipulator each time he desires to raise it. In order to move the tongs 168 in a transverse direction away from the wall 176, the operator need simply thrust the handle 166 toward the wall. This thrust is conveyed through the rigid frame of the manipulator causing the elongated tube 164 to ride on the rollers 188. On the other hand when it is desirable to move the tongs 168 in a direction parallel to the wall 176, the handle 166 is moved in said direction by the operator. In this event the movement is transferred through the elongated tube 164 which is caused to rotate about its own axis and contrary to the rolling direction of the rollers 188. Due to the fact that this movement is small compared to that of the tongs at the lower end of the supporting arm 194, no great amount of friction is created.

The rotational directions of the tongs and handle constitute the final movements of the manipulator. The first movement is the rotation of the tongs 168 in a clockwise or a counterclockwise direction about the longitudinal axis of the supporting arm 194A. This is accomplished simply by rotating the handle 166 in a horizontal plane about the supporting arm 194. As shown in Figure 15, the rotational force applied to the handle is transferred through both the shaft 316 to the trunnions 306 and through the pinion 335 to the gear wheels 290 and 292 to the bifurcated member 264, from which it is transferred through the arm 194 to the pulley wheel 204. From the pulley 204 the thrust is conveyed by the cable 220 to the pulley 204A, atop the supporting arm 194A where it is transferred to the tongs 168 through parts that are identical with those at the lower end of the supporting arm 194. It is to be pointed out that in this particular movement neither the pinion 335 nor the pinion 258 rotates. The second movement is the rotation of the tongs 168 in a clockwise or counterclockwise direction about the trunnions 306. As shown in Figure 15, when the handle 166 is rotated about the trunnions 306, the gear wheels 290 and 292 rotate in the same direction due to the fact that the pinion 335 engaging said wheels remains fixed. However (Figure 13) while the gear wheel 290 engages and rotates the bevel gear 284 in one direction, the gear wheel 292 engages and rotates the gear 280 in the opposite direction, causing the tubes 196 and 198 to act accordingly. Referring to Figure 10, the motions of the tubes 196 and 198 are transmitted to the pulleys 206 and 208, respectively, from which they are taken by the cables 222 and 224 to the pulleys 206A and 208A, respectively. From there the motions are transferred to the tongs 168.

The third movement is the rotation of the tongs 168 in a clockwise or counterclockwise direction with respect to its own axis. This is accomplished by rotating the handle 166 about its axis. Referring to Figure 15, the rotation of the handle 166 about its longitudinal axis causes the pinion 335 to rotate similarly, which in turn causes the gear wheels 290 and 292 to rotate in opposite directions with respect to each other. But since the gear wheel 290 engages the gear 284 on the side opposite to that which the gear wheel 292 engages the gear 280, the gears 280 and 284 revolve in the same direction causing the tubes 298 and 296 to act accordingly. For the same reason the pulleys 206 and 208 revolve in the same direction and their motion is conveyed by the cables 222 and 224 to the pulleys 206A and 208A, from which the motions are conveyed to the tongs 168 through parts similar to those in the arm 164 but in reverse order. Due to the fact that the gear wheel 290 has a greater diameter than the gear wheel 292, a slightly higher mechanical advantage exists in the former causing the gear 284 to revolve faster than the gear 280, whether they revolve in similar or opposite directions. This fact, however, is resolved out before it reaches the pinion 258 in the tongs 168 by the reverse action of the gear assembly at the same location. The advantage put into the tubes 196 and 196A by the pinion 335 at the handle end is taken out by a similar gear at the tongs end.

It is to be pointed out that the cable 218 engages the pulleys 302 (see Figure 15) when the handle and tongs are disposed at an angle to their supporting arms, but not when the handle and tongs are disposed in a straight line with respect to their supporting arms.

The third embodiment of this invention is that depicted in Figures 17 to 34. Like the second embodiment this is designed to straddle a protective wall with the handle in front of the wall and the tongs behind. The manipulator, generally indicated at 380 in Figure 17, comprises a handle 382, a tongs 384, and an intermediate supporting unit, generally indicated at 386. In this embodiment, the intermediate supporting unit includes an elongated tube 388 to which are attached support arms 390 and 392 and the various motion-conveying means to be described below. For the purpose of illustrating how it is adapted to be used in a work place, the manipulator is shown mounted on a protective wall 394 having a window 396. The wall 394 is constructed of material, such as concrete of the proper thickness, which will inhibit the passage of harmful radioactive rays. In the wall the window 396 is provided to enable the operator, manipulating the handle 382, to observe the movements of the tongs 384. The window may be either a thick mass of glass, or it may consist of an aqueous solution of zinc bromide contained between two plates of glass.

Figure 18:
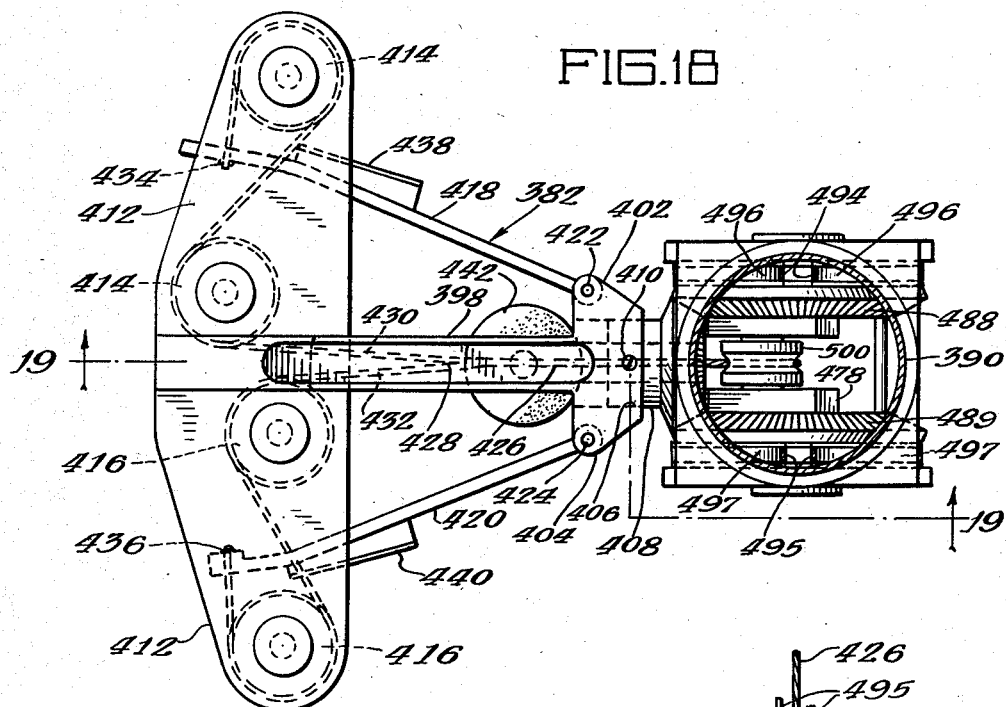
Figure 18 is an enlarged plan view of the handle and gear assembly of the embodiment shown in Figure 17.
Figure 19:
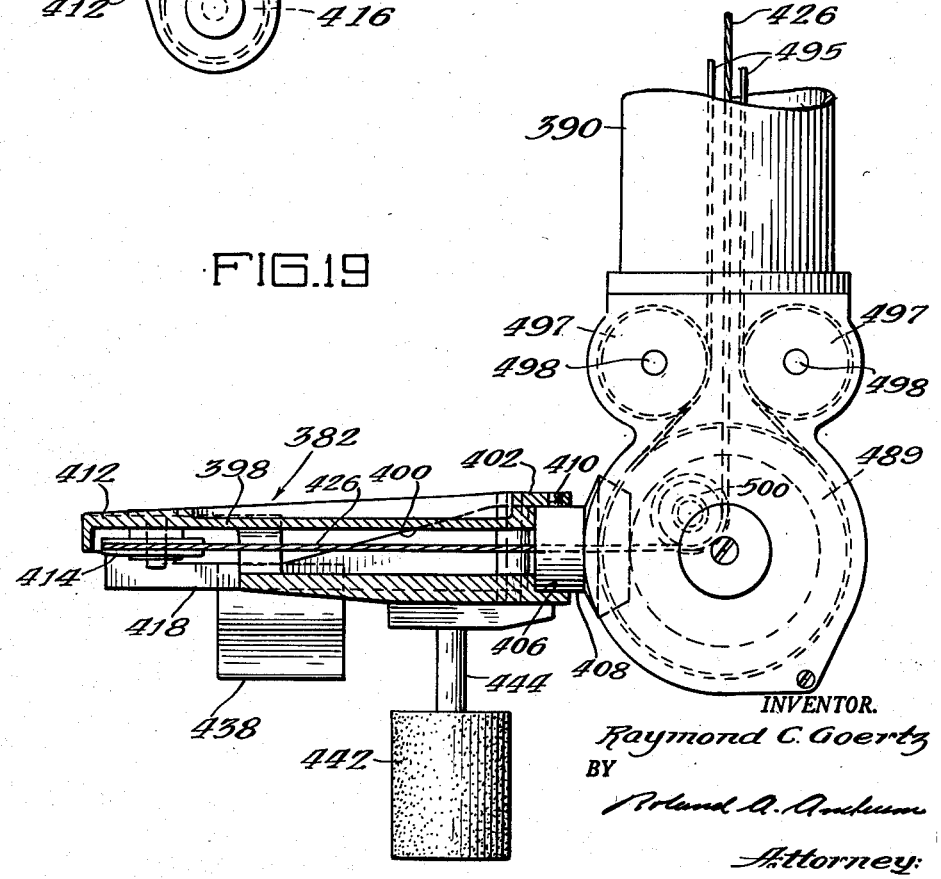
Figure 19 is an enlarged elevational view partly in section of the handle and gear assembly shown in Figure 18.

The handle 382, shown in Figures 18 and 19, comprises a number of parts. At the center of the handle is disposed a stock 398 which is bored longitudinally and apertured at 400 between the ends. The end nearer the arm 390 has a pair of flanges 402 and 404 protruding from either side. Between each pair of flanges the bored stock 398 communicates with a bore of a larger diameter at 406. Into the larger bore fits the hub of a pinion 408 secured by a set screw 410. At the other end of the stock 398 is disposed a wing member 412 which is normal to the axis of the stock and integral with it. Attached to the under surface is a pair of pulley wheels 414 and 416 disposed on either side of the shaft 398, respectively. The lever means for the handle includes a pair of fingers 418 and 420 which are pivoted at one end to the flanges 402 and 404 by a pin 422 and 424, respectively. The other end of each finger 418 and 420 extends beneath the wing member 412. A cable 426 which enters the handle via the bore in the pinion 408 and which passes centrally of the shaft 398 is spliced at 428 into two branches 430 and 432. While the branch 430 follows around the pulleys 414 and is anchored to the end of the finger 418 at 434, the branch 432 passes around the pulleys 416 and is anchored to the end of the finger 420 at 436 in a similar manner. Two finger plates 438 and 440 are secured to the fingers 418 and 420, respectively, in order to accommodate the index finger and thumb of the operator of the manipulator. Moreover, a knob 442 on a stem 444 is secured to the under surface of the stock 398 at approximately right angle thereto. In this manner the operator can grasp the knob 442 in the palm of his hand and extend his thumb and index finger to the finger plates 438 and 440.

The tongs 384, disposed at the lower end of the arm 392, is shown in Figure 20 and is identical with the tongs used in the first embodiment of this invention, as shown in Figure 4. Consequently, a brief description will be given for the purpose of showing the manner by which the tongs 384 is attached to a gear assembly which differs from that of the first embodiment and which is to be described fully hereinafter. The tongs 384 include a pair of jaws 446 which are coupled separately to a support member 448 by means of links 450 and 452. Each link 450 extends beyond its point of attachment to the support member 448 and turns outwardly therefrom at the center of said member between the links 452 forming rocker arms 454. On the longitudinal axis of the support member 448 is disposed a casing 456 within which is seated a sleeve 458 secured by a set screw 460. In turn, a pinion 462 is seated within the sleeve 458 where it is held by a set screw 464. The cable 426, which extends from the handle 382 over pulleys 500 and 652 in the manner shown schematically in Figure 31 to be described below, enters the tongs 384 through the casing 456 and is spliced at 466 into branches which are anchored at the extremities of the rocker arms 454. The jaws 446 are opened by a spring 467 and are closed in response to a tension in the cable 426 which is induced by squeezing together the fingers 418 and 420 in the handle 382, as shown in Figure 18.

The manner in which the tongs 384 is attached to the arm 392 is shown in cross-section in Figure 20 and is identical with the manner of attachment of the handle 382 which is shown in plan view in Figure 18 and in elevation in Figure 19. Since the cross-sectional views show the inner parts as well as the outer, the description will follow Figures 20, 21 and 22, it being understood that a description of one is a description of the other and that the parts are interchangeable. The lower ends of the arms 390 and 392 are seated in an annular collar 468, as shown in Figure 22. On its lower edge the collar 468 is provided with a shoulder against which are mounted two brace plates 470 and 472. In each plate is an aperture 474 disposed opposite each other. Between the apertures is disposed a gear supporting member 476 which is composed of several integral parts. The first part is a yoke 478 which is sustained in place by a trunnion 480 extending from each side of the yoke to the apertures 474 where the end of each trunnion is mounted in a ball bearing 482. An end plate 484 is attached to each end of the trunnion 480 by a screw 486. A pair of gear wheels 488 and 489 are mounted on the trunnions 480 by means of ball bearings 490 and the bearings 482. Each gear 488 and 489 includes a shoulder 492 and 493 which is grooved to receive a tape 494 and 495, respectively. Above the shoulders 492 and 493 is disposed a pair of idler wheels 496 and 497, respectively, which are mounted on shafts 498, the ends of which are disposed in the side braces 470 and 472. Between the bifurcations of the yoke 478 is disposed a pulley 500 which is mounted on a pin 502 and a ball bearing 504, as shown in Figure 21. The remaining part of the gear supporting member 476 is a shaft 506 which extends from the yoke 478 in a direction normal to the axis of the trunnions 480. Within the sleeve 458 is seated a ball bearing 508 that is also mounted on the shaft 506 secured thereto by a split ring 510. A collar 512 is located between the pinion 462 and the bearing 508. The pinion 462 is mounted on the shaft 506 by a roller bearing 514. The cable 426 extends centrally of the arm 392 around the pulley 500 from which it continues through the bore of the shaft 506 to the rocker arms 454 on the tongs 384.

Figure 17:
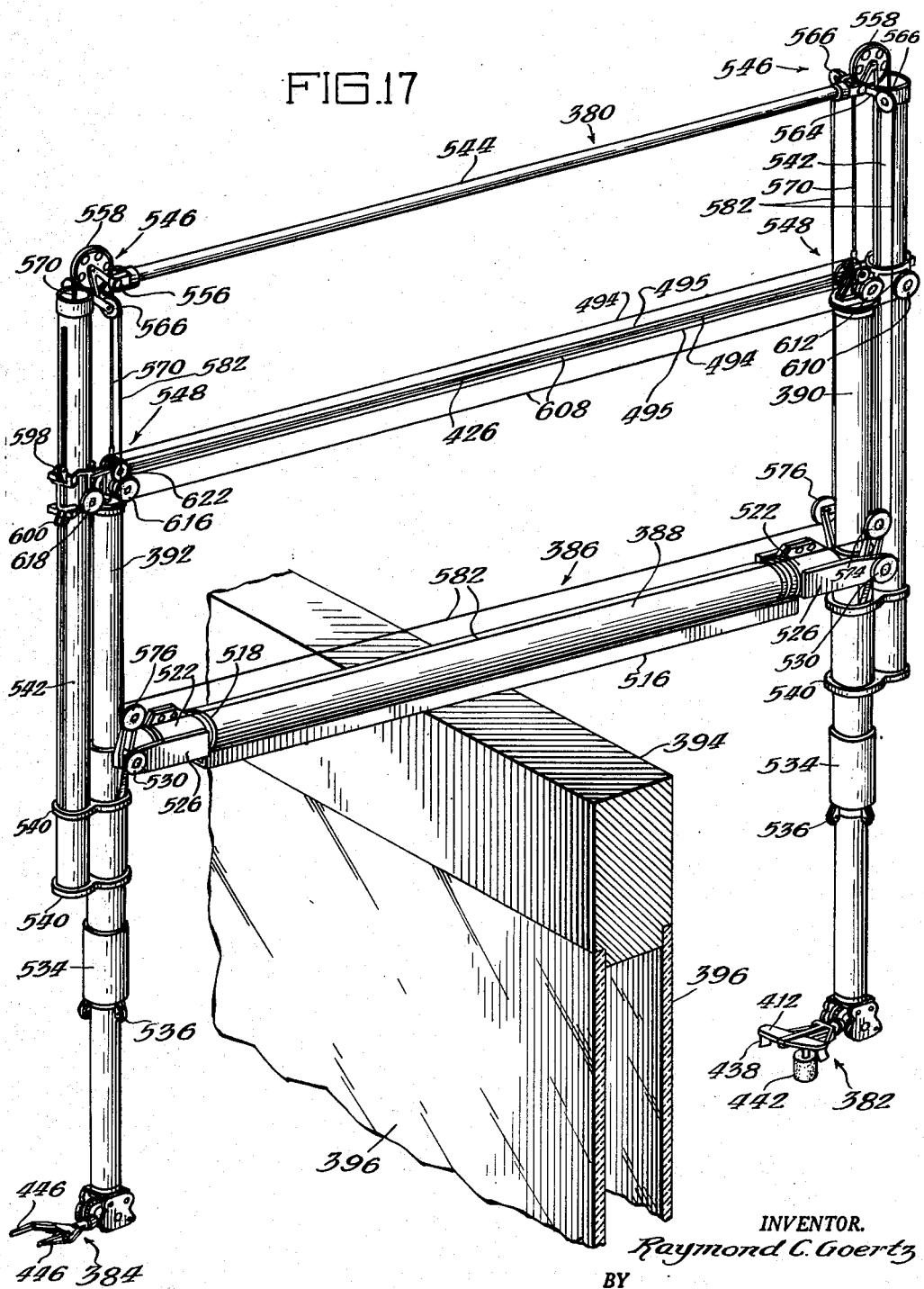
Figure 17 is a perspective view of the third embodiment of a manipulator, showing the manner in which it is mounted over a protective wall.

In this embodiment of the invention the intermediate supporting unit 386, as shown in Figure 17, comprises the elongated tube 388 and the arms 390 and 392. The elongated tube 388 is mounted in a channel beam 516. Near each end of the tube 388 on the outside surface is an annular groove 518 shown in Figure 23. In the grooves are seated a pair of roller wheels 520 which are mounted to the bottom of the channel 516 beneath the tube 388. When the tube 388 is rotated about its longitudinal axis it rides upon these wheels. At each end of the tube 388 a split sleeve 522 it attached by means of screws 524. A pair of flanges 526 is secured to each side of the sleeve 522 and extend beyond the end of the tube 388, as shown in Figure 25. A casing 528 is disposed between the extremities of the flanges 526 to which it is rotatably mounted by means of trunnions 530 which are attached to braces 532 on the side of said casing. The arm 390 is disposed within the casing 528 where it is adapted to move longitudinally as well as to rotate about its own axis. At the lower end of the casing 528, a sleeve 534 is attached for the purpose of reinforcement. A number of small roller wheels 536 are secured to the lower end of the sleeve 534 and the casing 528 in order to center the arm 390 therein. On the casing 528, below the braces 532 is a sleeve 538 which supports two stayers 540 which in turn sustain an upright member 542.

Figure 26:
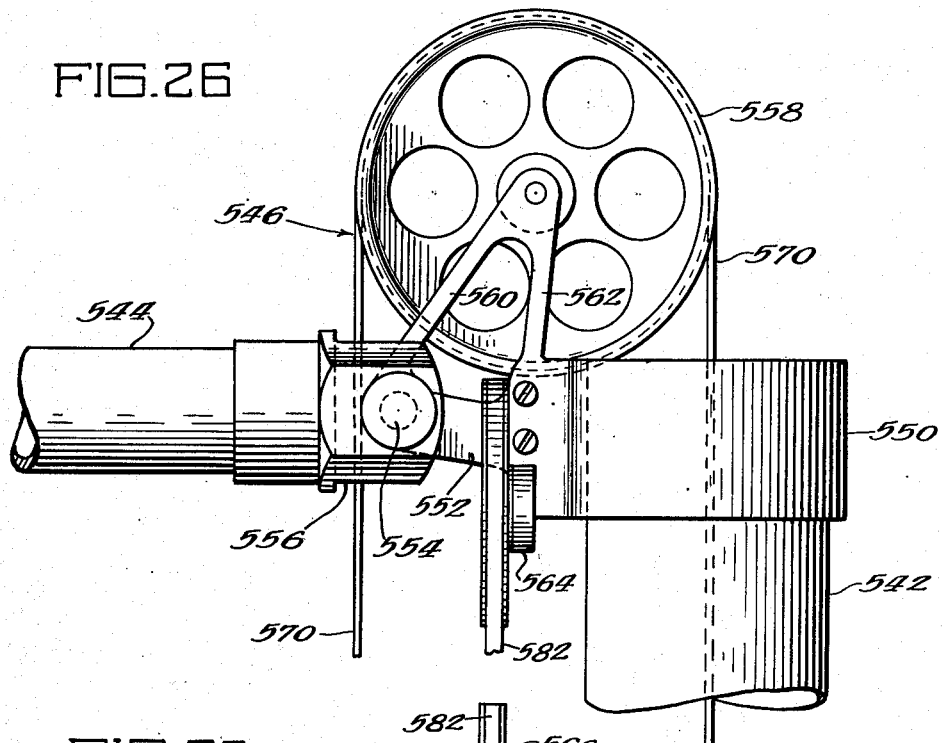
Figure 26 is an enlarged fragmentary elevational view of the top pulley wheels and the connection between the top connecting rod and the upright member as shown in Figure 17.
Figure 27:
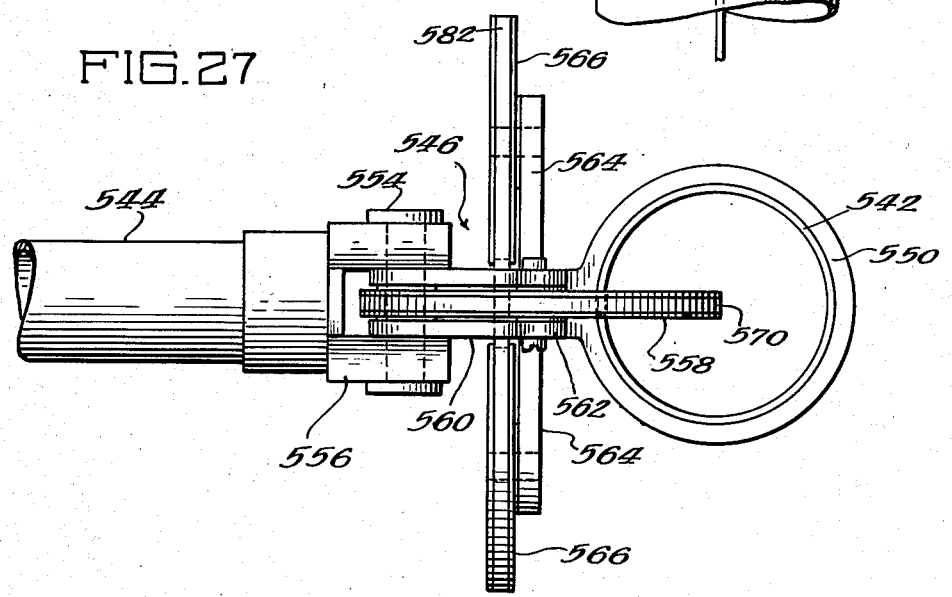
Figure 27 is a plan view of the members shown in Figure 26.
Figure 28:
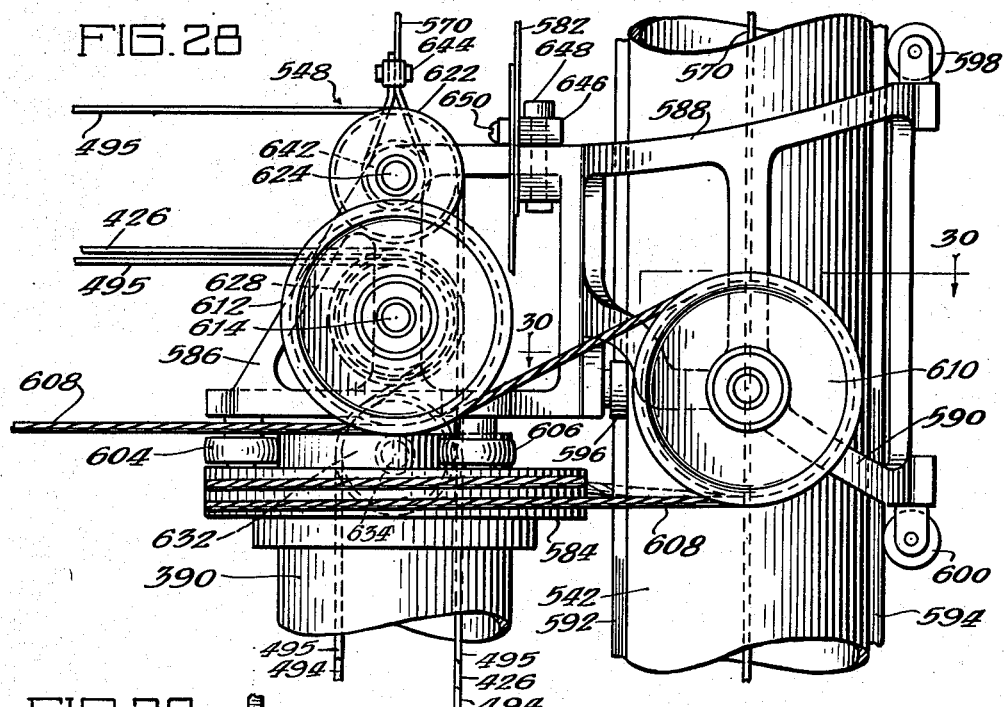
Figure 28 is an enlarged fragmentary elevational view of the gear assembly and the frame which surmounts the parallel arm above the connection to the elongated tube as shown in Figure 17.

In Figure 17, across the top of the manipulator is disposed a connecting bar 544 each end of which is attached to a mounting unit, generally indicated at 546, which surmounts the top of each upright member 542. The connecting bar 544 is part of the intermediate supporting unit. Atop each supporting arm 390 and 392 is mounted an assembly of pulley wheels, generally indicated at 548. In Figure 26, the mounting unit 546 is shown in detail. The entire unit is dependent upon a sleeve 550 which is securely fixed to the top of the upright member 542. Extending from the sleeve 550 is a brace 552 to which the connecting rod 544 is pivotally attached by a pin 554 which extends through the branches of a bifurcated member 556 on the end of said rod (see also Figure 27). The sleeve 550 also supports a pulley 558 by means of upright members 560 and 562. In addition, a pair of arms 564 extending in opposite directions to each other from the sleeve 550 are provided to support a pair of pulleys 566 in a plane normal to that of the pulley 558. When the operator wishes to raise or lower the supporting arms 390 and 392, his actions are facilitated by a counterweight 568 which is housed within the upright member 542, as shown in Figure 23. The counterweight 568 is suspended on a cable 570 which follows a course around the top of the pulley 558, as shown in Figure 26, and then downward to the top of the pulley assembly 548 to which the other end is attached, as shown in Figure 28. By means of the counterweight 568 attached to each arm 390 and 392, said arms are sustained at the desired location and relieve the operator of the burden of constantly applying a force equal to the weight of the arm.

Referring again to Figures 23 and 24, pulleys 574 and 576 are mounted on braces 578 and 580, respectively, which extend from each side of the casing 528 above the trunnions 530. These pulleys and the pulleys 566 at the top of the upright member 542 are employed together with a similar set on the other side of the manipulator to raise or lower the arms 390 and 392 simultaneously. This is accomplished by a continuous tape 582 which is disposed tautly over said pulleys in the manner shown in Figure 33. The upper ends of the arms 390 and 392 are attached on opposite sides to the tape 582 so that when the arm 390 is raised the tape is started in motion about the several pulleys causing the arm 392 to raise also. Conversely, when the arm 390 is lowered, the direction of movement of the tape 582 is reversed causing the arm 392 to be lowered also.

Figure 29:
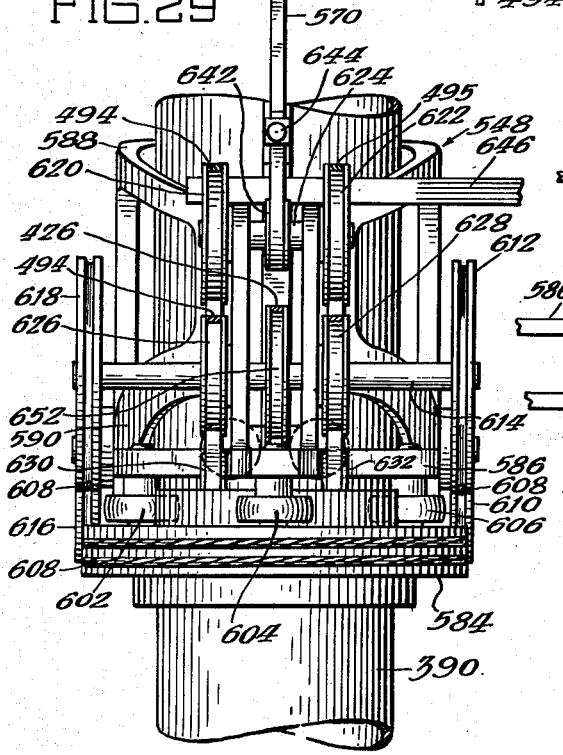
Figure 29 is an enlarged fragmentary end view of the gear assembly and frame shown in Figure 28.
Figure 30:
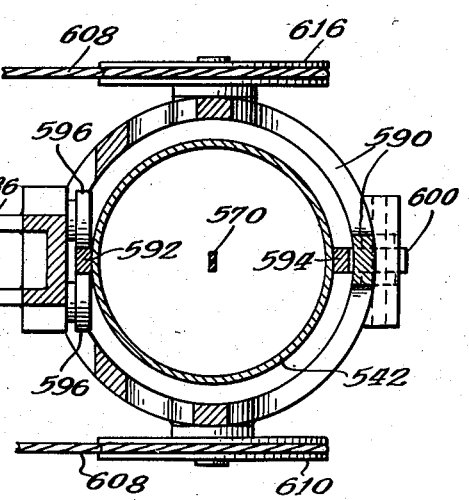
Figure 30 is a fragmentary plan view of the upright member and braces taken on the line 30—30 of Figure 28.
Figure 31:
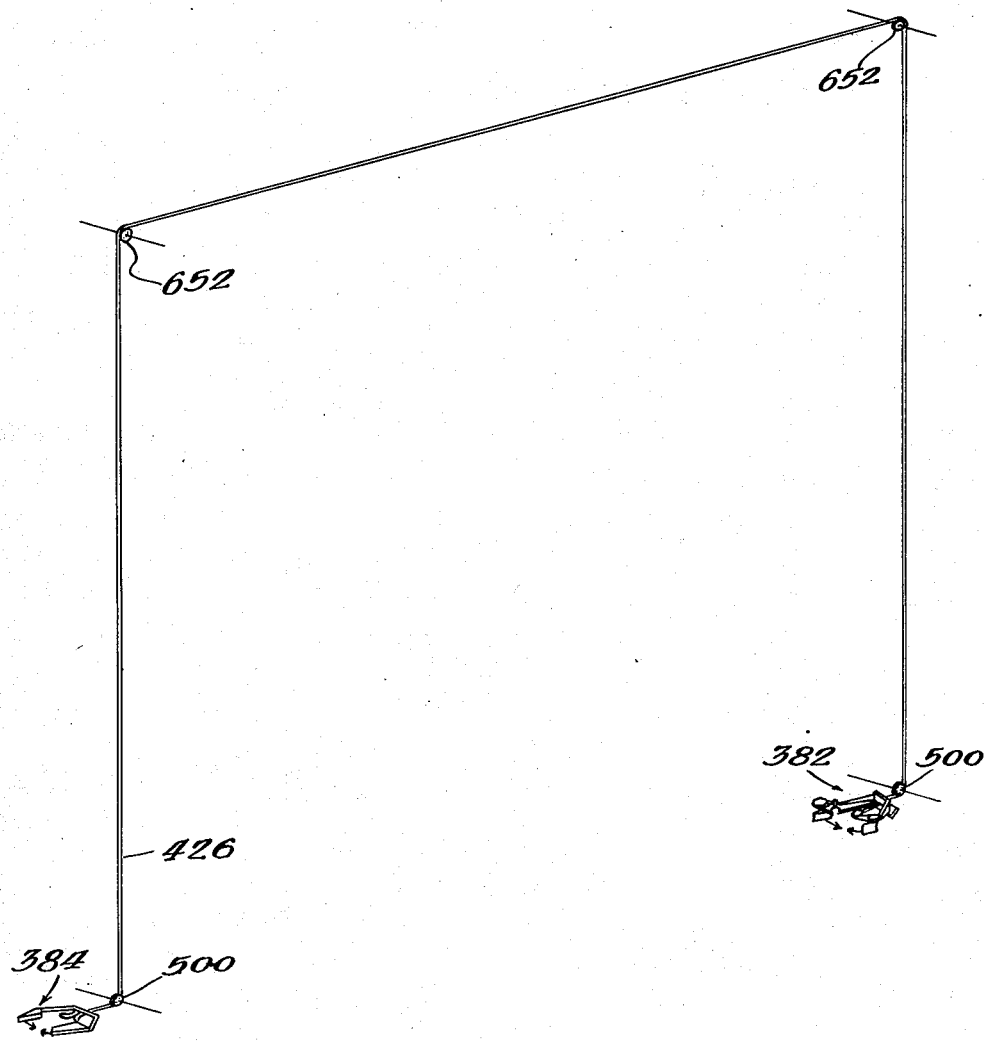
Figure 31 is a diagrammatic drawing of the connecting cable between the handle and tongs which operates the jaws of the tongs in response to squeezing the handle in the direction shown by the arrows.

Near the top of each parallel arm 390 and 392 a winch 584 is secured to the outer periphery, as shown in Figure 28. The pulley assembly 548 is mounted at the top of the arm 390 immediately above the position of the winch 584. This assembly includes a frame 586 which serves not only as a mount for various pulleys but also as a means of support for the upright member 542, as shown by two circular braces 588 and 590 which are integral with the frame 586, and which completely surround the upright member 542, as shown in Figures 29 and 30. A rib 592 extends longitudinally of the outer surface of the upright member 542 on the line nearest the arm 390. Likewise a rib 594 is attached to said member at 180° from the rib 592. A pair of small roller wheels 596 is mounted on the lower end of an upright portion of the frame 586. These wheels engage opposite sides of the rib 592 along which they roll when the arm 390 moves up or down with respect to the stationary upright member 542, inhibiting the frame from shifting its position. Another pair of rollers 598 and 600 is mounted on the circular braces 588 and 590, respectively, and are adapted to ride along the outside edge of the rib 594 holding said circular braces 588 and 590 clear of the upright member 542 as the frame 586 on the arm 390 is moved in a vertical direction (Figure 30). As shown in Figures 28 and 29, three roller wheels 602, 604 and 606 are mounted to the lower horizontal element of the frame 586 and are adapted to roll about the periphery of that portion of the arm 390 which extends above the winch 584 as said arm is rotated about its vertical axis. This rotation is accomplished by the operator simply by rotating the handle 382 in a clockwise or counterclockwise direction with respect to the axis of the arm 390, as shown by the arrow in Figure 34. In response to this rotation the tongs 384 on the arm 392 respond by turning in a direction corresponding to the handle 382. Manifestly, as the arm 390 is turned, the winch 584 transmits the motion to a cable 608 which engages the winch, as shown in Figure 28. Upon leaving the winch 584 the cable 608 follows a course around a pulley 610, which is pivoted to the circular brace 590 (Figure 28) and from which the cable continues to a pulley 612 which is pivoted on an axle 614 mounted in the frame 586 (Figure 29). The pulley 612 is disposed in the same vertical plane as the pulley 610. A pair of pulleys 616 and 618 corresponding to the pulleys 610 and 612, respectively, are disposed on the opposite side of the frame 586, as shown in Figure 29. On that side of the frame the continuous cable 608 leaves the winch 584 and follows a course around the pulley 616 and 618 in a manner identical to that shown for the pulleys 610 and 612 in Figure 28. Referring now to Figure 34, the arm 392 is shown with an assembly of pulleys and a winch corresponding to that surmounting the top of the arm 390, as explained above. It is evident that the continuous cable 608 upon leaving the pulleys 612 and 616 atop the arm 390 extends across the manipulator to corresponding pulleys at the top of the arm 392. By virtue of this type of assembly, it is possible to rotate the handle 382 when the arms 390 and 392 form not only right angles with the elongated tube 388 but also when they from any other angle as they are rotated about their trunnions 530, because the cable 608 leaves the pulleys 612 and 618 tangentially at any angle.

Figure 32:
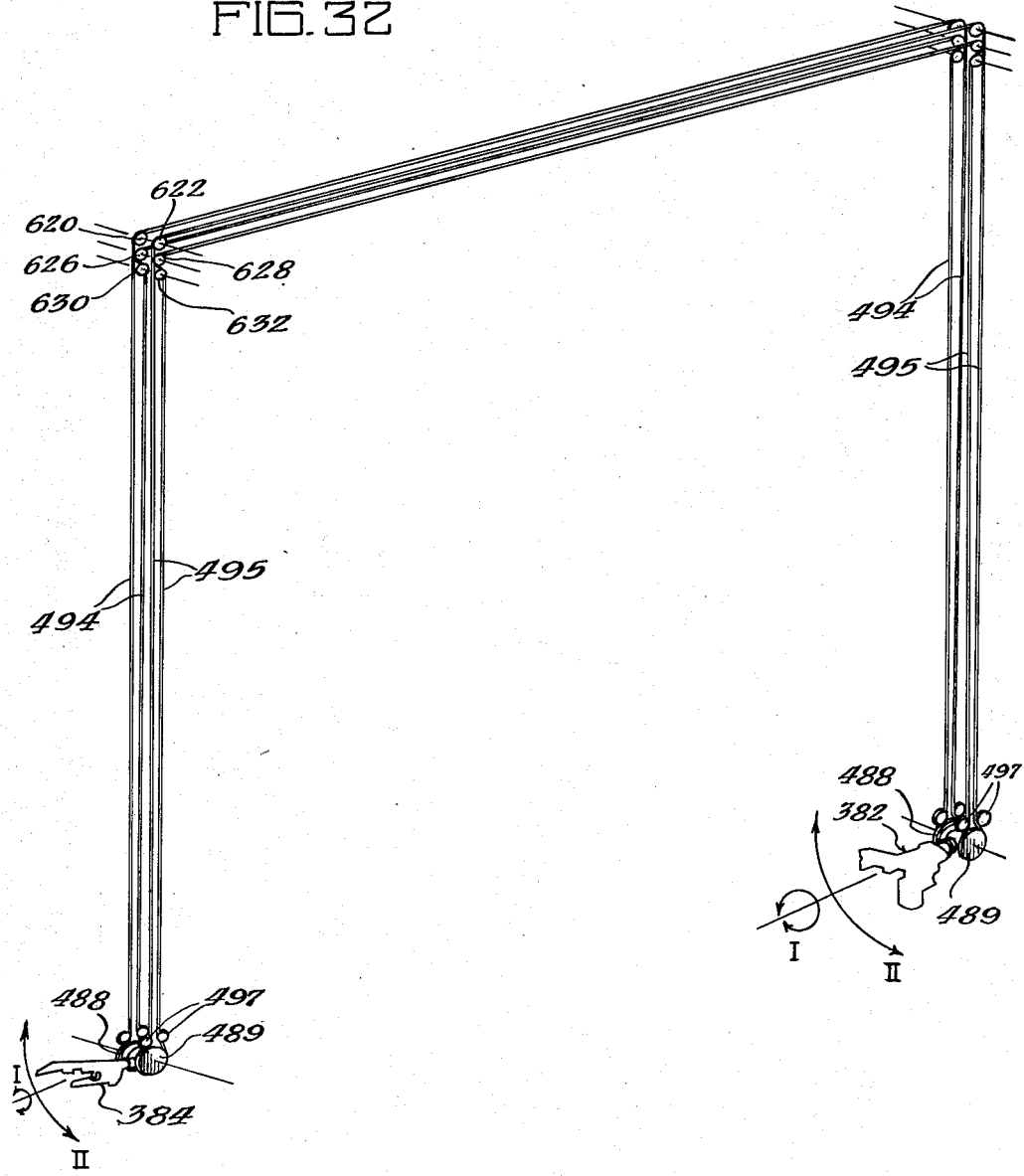
Figure 32 is a diagrammatic drawing of the two continuous tapes connecting the gear assemblies to which the tongs and handle are attached and showing directional arrows in which the tapes operate the tongs in response to similar movement of the handle.

At the center of the frame 586, as shown in Figures 28 and 29, three pairs of pulleys are mounted to said frame, one pair above the other. The top pair 620 and 622 is mounted on a pin 624 sustained by the frame 586. The middle pair of pulleys 626 and 628 is mounted on the axle 614 to which the pulleys 610 and 618 are also attached. The lower pair of pulleys 630 and 632 is mounted on a pin 634 (Figure 28) in a manner similar to that shown for the pulleys 620 and 622. In Figure 32, these pulleys are shown schematically with respect to their locations as just described. Here the pulleys 622, 628 and 632 are shown engaging the continuous tape 495. As this tape leaves the pulley 622 it follows a downward path within the arm 390 to the lower end where it passes around the shoulder 493 of the gear 489 where it is held by the idler wheels 497. Following a path back up the arm 390, the tape 495 engages the pulley 632 from which it passes to the pulley 628 directly above. It is to be pointed out that the pulley 622 has a diameter slightly greater than that of the pulleys 628 and 632 below it in order that the tape 495 will clear the latter pulleys as it passes them. Upon leaving the pulleys 622 and 628 the two strands of the tape 495 move horizontally across the manipulator to a similar assembly in the tube 392. In a similar manner, the tape 494 engages the pulleys 620, 626 and 630 and is disposed within the arms 390 and 392 where it is mounted around the shoulder of the gear wheels 488. The function of the tapes 494 and 495 is to convey the two rotational movements of the handle 382 to the tongs 384. The first rotation is about the longitudinal axis of the handle 382 which corresponds to the circular arrow I in Figure 32. When this rotation takes place the pinion 408 attached to the handle rotates the gears 488 and 489 in opposite directions causing the tapes 494 and 495 to move in opposite directions with respect to each other. These opposite motions are transferred to corresponding gears at the lower end of the tube 392 causing the tongs 384 to rotate in the same manner as the handle 382. On the other hand, the second rotation is that of the handle 382 in a clockwise or counterclockwise direction about the axis of the pulleys 488 and 489, which direction is indicated by the arced arrows II in Figure 32. When such rotation takes place, the pinion 408 (Figure 18) rotates each of the gears 488 and 489 in the same direction causing the tapes 494 and 495 to move likewise. Since the gears 488 and 489 attached to the pinion 462 on the tongs 384 are forced to rotate in the same direction, the tongs rotate in a direction corresponding to that of the handle 382.

It was mentioned above that the tape 570 to which the counterweight 568 is attached at one end is secured to the frame 586 at the other end (Figure 29). The place of attachment is located between the pulleys 620 and 622 on the pin 624 around which the cable 570 is looped on a bearing 642 and held in place by a small screw clamp 644. Also mentioned above in reference to Figure 33 was the fact that the arms 390 and 392 are attached to the tape 582. The mode of attachment is an arm 646 one end of which is clamped by means of a nut and bolt 648 to the top of the frame 586, as shown in Figure 28. To the other end of the arm 646, which extends horizontally from the frame 586, the ends of the tape 582 are firmly secured by a screw 650 (see Figure 28). In the Figure 33, it is evident that the arms 646 necessarily extend from the tops of the arms 390 and 392 in opposite directions which fact is necessary in order to move the arms in the same direction due to the different directional movements of the continuous tape 582.

As shown in Figures 28 and 29, between the pulleys 626 and 628, the pulley 652 is mounted on the axle 614 below the point of attachment of the tape 570. The pulley 652 serves the tape 426 which is sustained within the arm 390 between the tapes 494 and 495, as shown in Figure 24. It has already been indicated that the cable 426 is used between the handle 382 and the tongs 384 to close the jaws 446 of said tongs.

Most of the operations of the manipulator have been described above in conjunction with the structural description. There remain, however, two movements which have not been mentioned. These are dependent upon the manner in which the arms 390 and 392 are attached to the elongated tube 388. On the one hand, when it is desirable to move the tongs 384 in a direction parallel to the wall 394, the handle 382 is moved in said direction by the operator. Due to the fact that both arms 390 and 392 are mounted on the elongated tube 388 by means of oppositely disposed trunnions 530, this tube is forced to rotate about its longitudinal axis, riding on the roller wheels 520 which are mounted beneath it.

The remaining movement is in the direction perpendicular to the wall 394. When it is desirable to move the tongs 384 away from the wall, the operator simply thrusts the handle 382 towards the wall. In this movement the arms 390 and 392 function as first-class levers being pivoted to the tube 388 at the trunnions 530, and the connecting rod 544 attached to the top of the manipulator maintains the parallelism between the two arms.

It is to be pointed out that each movement of the manipulator is performed independently and separately from the parts required for any other movement. That is to say no particular motion need be sacrificed while another motion is taking place.

Since the manipulator can be operated by one hand, best results are obtained when the operator uses a manipulator for each hand. Thus an operator with two manipulators at his disposal can stand on one side of the protective wall 394 and observe through the window 396 the motions he wishes to perform with two tongs 384 on the other side of the wall.

Obviously these embodiments are susceptible to modification. Therefore the scope of the invention shall not be deemed to be limited by the description above and the embodiments of the drawings, but should be determined by the appended claims.

What is claimed is:

1. A remote control manipulator comprising tongs including a pair of movable jaws, a handle including a hand grasping member adapted to be grasped by the operator with the palm of the hand and lever means pivotally secured with respect to the hand grasping member, the lever means being disposed closely adjacent the hand grasping member and within finger reach of the operator when the hand grasping member is grasped by the palm of the operator, an intermediate supporting unit, means mounting the tongs on one end of the intermediate unit, means mounting the handle on the other end of the intermediate unit, the first means including trunnions about which the tongs is adapted to rotate, the second means including trunnions about which the handle is adapted to rotate, the intermediate supporting unit including mechanical motion-conveying means operatively connected to the tongs and the handle so as to cause rotation of the tongs in response to rotation of the handle, and means operatively connecting the lever means to the jaws so that movement of the lever means imparts movement to the jaws.

2. A remote control manipulator comprising tongs including a pair of movable jaws, a handle including a hand grasping member adapted to be grasped by the operator with the palm of the hand and lever means pivotally secured with respect to the hand grasping member, the lever means being disposed closely adjacent the hand grasping member and within finger reach of the operator when the hand grasping member is grasped by the palm of the operator, a pinion secured to the tongs, a pinion secured to the handle, an intermediate supporting unit, means mounting the pinion of the tongs on one end of the intermediate unit including trunnions about which the tongs rotate, means mounting the pinion of the handle on the other end of the intermediate unit including trunnions about which the handle rotates, the first means including a pair of gear wheels mounted on the trunnions and engaging the pinion of the tongs, the second means including a pair of gear wheels mounted on the trunnions and engaging the pinion of the handle, the intermediate supporting unit including mechanical motion-conveying means operatively connected to the gear wheels of the tongs and handle so as to cause rotation of the tongs in response to rotation of the handle, and means operatively connecting the lever means to the jaws so that movement of the lever means imparts movement to the jaws.

3. A remote control manipulator comprising tongs including a pair of movable jaws, a handle including lever means pivotally attached thereto, an intermediate supporting unit, means mounting the tongs on one end of the intermediate unit including a pair of gear wheels and a pair of gears adjacent to the gear wheels, the gears being disposed concentrically with respect to each other, one gear meshing with one gear wheel and the other gear meshing with the other gear wheel, means mounting the handle on the other end of the intermediate unit including a pair of gear wheels and a pair of gears adjacent to the gear wheels, the gears being disposed concentrically with respect to each other, one gear of said second pair meshing with one gear wheel and the other gear of said second pair meshing with the other gear wheel, the first means including trunnions about which the tongs and the first pair of gear wheels are adapted to rotate, the second means including trunnions about which the handle and the second pair of gear wheels are adapted to rotate, the intermediate supporting unit including mechanical motion-conveying means operatively connected separately to corresponding gears of the tongs and handle so as to cause rotation of the tongs in response to rotation of the handle, and means operatively connecting the lever means to the jaws so that movement of the lever means imparts movement to the jaws.

4. A remote control manipulator comprising tongs including a pair of movable jaws, a handle including lever means pivotally attached to the handle, a pinion secured to the tongs, a pinion secured to the handle, an intermediate supporting unit, means mounting the pinion of the tongs on one end of the intermediate supporting unit including a pair of gear wheels meshing with the pinion and a pair of gears adjacent to the gear wheels, the gears being disposed concentrically with respect to each other, one gear meshing with one gear wheel and the other gear meshing with the other gear wheel, means for mounting the pinion of the handle on the other end of the intermediate supporting unit including a pair of gear wheels meshing with the pinion and a pair of gears adjacent to the gear wheels, the gears being disposed concentrically with respect to each other, one gear of said second pair meshing with the one gear wheel and the other gear of said second pair meshing with the other gear wheel, the first means including trunnions about which the tongs and the second pair of gear wheels are adapted to rotate, the second means including trunnions about which the handle and the second pair of gear wheels are adapted to rotate, the intermediate supporting unit including mechanical motion-conveying means operatively connected separately to corresponding gears of the tongs and handle so as to cause rotation of the tongs in response to rotation of the handle, and means operatively connecting the lever means to the jaws so that movement of the lever means imparts movement to the jaws.

5. A remote control manipulator comprising tongs including a pair of movable jaws, a handle including lever means pivotally attached to the handle, a pinion secured to the tongs, a pinion secured to the handle, an intermediate supporting unit, means mounting the pinion of the tongs on one end of the intermediate supporting unit including a pair of gear wheels meshing with the pinion and a pair of gears adjacent to the gear wheels, the gears being disposed concentrically with respect to each other, one gear meshing with one gear wheel and the other gear meshing with the other gear wheel, means mounting the pinion of the handle on the other end of the intermediate supporting unit including a pair of gear wheels meshing with the pinion and a pair of gears adjacent to the gear wheels, the gears being disposed concentrically with respect to each other, one gear of said second pair meshing with the one gear wheel and the other gear of said second pair meshing with the other gear wheel, the first means including trunnions about which the tongs and the first pair of gear wheels are adapted to rotate, the second means including trunnions about which the handle and the second pair of gear wheels are adapted to rotate, the intermediate supporting unit including mechanical motion-conveying means including tubes concentrically disposed with respect to each other and operatively connected to corresponding gears of the tongs and handle so as to cause rotation of the tongs in response to rotation of the handle, and means operatively connecting the lever means to the jaws so that movement of the lever means imparts movement to the jaws.

6. A remote control manipulator comprising tongs including a pair of movable jaws, a handle including lever means pivotally secured to the handle, an intermediate supporting unit including an elongated tube on which a pair of support arms is rotatably mounted, means mounting the tongs on one end of one of the arms including a pair of gear wheels, means mounting the handle at one end of the other arm including a pair of gear wheels, the first means including trunnions about which the tongs and the first pair of gear wheels are adapted to rotate, the second means including trunnions about which the handle and the second pair of gear wheels are adapted to rotate, the intermediate supporting unit including mechanical motion-conveying means operatively connecting separately to corresponding gear wheels of the tongs and handle so as to cause rotation of the tongs in response to rotation of the handle, and means operatively connecting the lever means to the tongs so that movement of the lever means imparts movement to the jaws.

7. A remote control manipulator comprising tongs including a pair of movable jaws, a handle including lever means pivotally secured to the handle, a pinion secured to the tongs, a pinion secured to the handle, an intermediate supporting unit including an elongated tube on which a pair of support arms is rotatably mounted, means mounting the pinion of the tongs on one end of one of the arms including a pair of gear wheels meshing with the pinion, means mounting the pinion of the handle on one end of the other arm including a pair of gear wheels meshing with the pinion, the first means including trunnions about which the tongs and the first pair of gear wheels are adapted to rotate, the second means including trunnions about which the handle and the second pair of gear wheels are adapted to rotate, the intermediate supporting unit including mechanical motion-conveying means operatively connected separately to corresponding gear wheels of the tongs and handle so as to cause rotation of the tongs in response to rotation of the handle, and means operatively connecting the lever means to the jaws so that movement of the lever means imparts movement to the jaws.

8. A remote control manipulator comprising tongs including a pair of movable jaws pivotally mounted to a pair of contiguous rocker arms, a handle including lever means pivotally secured to the handle, an intermediate supporting unit, means mounting the tongs on one end of the intermediate unit including a pair of gear wheels, means mounting the handle on the other end of the intermediate supporting unit including a pair of gear wheels, the first means including trunnions about which the tongs and the first pair of gear wheels are adapted to rotate, the second means including trunnions about which the handle and the second pair of gear wheels are adapted to rotate, the intermediate supporting unit including mechanical motion-conveying means operatively connected separately to corresponding gear wheels of the tongs and handle so as to cause rotation of the tongs in response to rotation of the handle, and means operatively connecting the lever means to the rocker arms of the tongs so that movement of the lever means imparts movement to the jaws.

9. A remote control manipulator comprising tongs including a pair of movable jaws pivotally mounted to a pair of contiguous rocker arms, a handle including lever means pivotally secured to the handle, a pinion secured to the tongs, a pinion secured to the handle, an intermediate supporting unit, means mounting the pinion of the tongs on one end of the intermediate supporting unit including a pair of gear wheels meshing with the pinion, means mounting the pinion of the handle on the other end of the intermediate supporting unit including a pair of gear wheels meshing with the pinion, the first means including trunnions about which the tongs and the first pair of gear wheels are adapted to rotate, the second means including trunnions about which the handle and the second pair of gear wheels are adapted to rotate, the intermediate supporting unit including mechanical motion-conveying means operatively connected separately to corresponding gear wheels of the tongs and handle so as to cause rotation of the tongs in response to rotation of the handle, and means operatively connecting the lever means to the rocker arms of the tongs so that movement of the lever means imparts movement to the jaws.

10. A remote control manipulator comprising tongs including a pair of movable jaws, a handle including lever means pivotally secured to the handle, an elongated tube, means mounting the tongs on one end of the elongated tube, means mounting the handle on the other end of the elongated tube, the first means including trunnions about which the tongs is adapted to rotate, the second means including trunnions about which the handle is adapted to rotate, two tubes concentrically disposed within the elongated tube operatively connected to the tongs and the handle so as to cause rotation of the tongs in response to rotation of the handle, and means operatively connecting the lever means to the jaws so that movement of the lever means imparts movement to the jaws.

11. A remote control manipulator comprising tongs including a pair of movable jaws, a handle including lever means pivotally secured to the handle, an intermediate supporting unit including an elongated tube to which a pair of supporting arms are rotatably mounted, means mounting the tongs on the lower end of one arm, means mounting the handle on the lower end of the other arm, the first means including trunnions about which the tongs is adapted to rotate, the second means including trunnions about which the handle is adapted to rotate, the intermediate supporting unit including a pulley mounted on the upper end of each arm and a continuous cable operatively disposed therebetween so as to cause rotation of one arm in response to rotation of the other, the intermediate supporting unit including mechanical motion-conveying means operatively connected to the tongs and the handle so as to cause rotation of the tongs in response to rotation of the handle, and means operatively connecting the lever means to the jaws so that movement of the lever means imparts movement to the jaws.

12. A remote control manipulator comprising tongs including a pair of movable jaws, a handle including lever means secured thereto, an intermediate supporting unit including an elongated tube to which a pair of parallel supporting arms are rotatably and slidably mounted, means mounting the tongs on the lower end of one of the arms, means mounting the handle on the lower end of the other arm, the first means including trunnions about which the tongs is adapted to rotate, the second means including trunnions about which the handle is adapted to rotate, the intermediate supporting unit including a winch at the top of each arm and a continuous cable operatively disposed therebetween so as to cause rotation of one arm in response to rotation of the other, the intermediate supporting unit including an upright member extending above each arm and mounted to the elongated tube at the same locations as the arms, each upright member having at least one pulley at the upper extremity and two pulleys mounted near the location where the arm is mounted and having a continuous tape tautly disposed about said pulleys to which tape the upper end of each arm is secured so that one arm may be raised or lowered in response to a similar motion in the other arm, and the intermediate supporting unit including motion-conveying means between the handle and tape including two continuous tapes operatively disposed between the first means and the second means so that rotation of the tongs may be had in response to rotation of the handle.

13. A remote control manipulator, comprising a support unit, a manipulatable instrument at one end of the unit, control means remote from the instrument, and motion-conveying means operatively connected to the control means and to the instrument for rotating the instrument about three right-angled axes in response to identical movements of the control means, the instrument being rotatable independently of the support unit.

14. A remote control manipulator, comprising a support unit, tongs having movable jaws on one end of the unit, a handle on the other end of the unit, including a hand grasping member adapted to be grasped by the operator with the palm of the hand and lever means pivotally secured with respect to the hand grasping member, the lever means being disposed closely adjacent the hand grasping member and within finger reach of the operator when the hand grasping member is grasped by the palm of the operator, motion-conveying means operatively connected to the tongs and the grasping member for actuating the tongs in three spacial directions and for rotating the tongs about three right-angled axes in response to identical movements of the handle, and means connecting the jaws and the lever means for opening and closing the jaws in response to pressure transmitted therethrough.

RAYMOND C. GOERTZ.

REFERENCES CITED

The following references are of record in the file of this patent:

UNITED STATES PATENTS

| Number | Name | Date |
| --- | --- | --- |
| 935,485 | Galoffre | Sept. 28, 1909 |
| 989,530 | Macduffee | Apr. 11, 1911 |
| 1,368,717 | Gosar | Feb. 15, 1921 |
| 1,540,142 | Pierpoint | June 2, 1925 |
| 2,476,249 | Payne, Jr. | July 12, 1949 |

FOREIGN PATENTS

| Number | Country | Date |
| --- | --- | --- |
| 151,431 | Great Britain | Sept. 30, 1920 |